US009742779B2

(12) United States Patent
Ngo et al.

(10) Patent No.: US 9,742,779 B2
(45) Date of Patent: Aug. 22, 2017

(54) METHOD AND APPARATUS FOR SECURELY PROVIDING ACCESS AND ELEVATED RIGHTS FOR REMOTE SUPPORT

(75) Inventors: Huey Jiun Ngo, Flowood, MS (US); Nathan Joel McNeill, Ridgeland, MS (US)

(73) Assignee: Bomgar Corporation, Ridgeland, MS (US)

( * ) Notice: Subject to any disclaimer, the term of this patent is extended or adjusted under 35 U.S.C. 154(b) by 1135 days.

(21) Appl. No.: 12/755,350

(22) Filed: Apr. 6, 2010

(65) Prior Publication Data

US 2010/0257596 A1  Oct. 7, 2010

Related U.S. Application Data

(60) Provisional application No. 61/166,966, filed on Apr. 6, 2009.

(51) Int. Cl.
*H04L 29/06* (2006.01)
*G06F 21/62* (2013.01)

(52) U.S. Cl.
CPC ........ *H04L 63/102* (2013.01); *G06F 21/6218* (2013.01); *H04L 63/08* (2013.01)

(58) Field of Classification Search
None
See application file for complete search history.

(56) References Cited

U.S. PATENT DOCUMENTS

| 7,117,529 B1* | 10/2006 | O'Donnell et al. .............. 726/6 |
| 8,166,310 B2* | 4/2012 | Harrison et al. .............. 713/184 |
| 2003/0065731 A1* | 4/2003 | Mohammed et al. ......... 709/208 |
| 2005/0190769 A1* | 9/2005 | Smith ......................... 370/395.2 |
| 2007/0180501 A1* | 8/2007 | Yadav et al. ....................... 726/5 |
| 2009/0052675 A1* | 2/2009 | Levow et al. ................. 380/278 |
| 2010/0154009 A1* | 6/2010 | Del Sordo ....................... 725/62 |

* cited by examiner

*Primary Examiner* — Benjamin Lanier
(74) *Attorney, Agent, or Firm* — Ditthavong & Steiner, P.C.

(57) ABSTRACT

An approach is provided to allow remote support representatives to carry out remote support session with minimal access and privileges to remote systems. An attempt is detected to establish a remote support session via a remote support appliance that is configured to establish the remote support session between a first device associated with a support representative and a second device associated with a user. A credential that provides an elevated access privilege is retrieved in response to the detection. The credential is provided to the first device for use in the establishment of the remote support session.

20 Claims, 19 Drawing Sheets

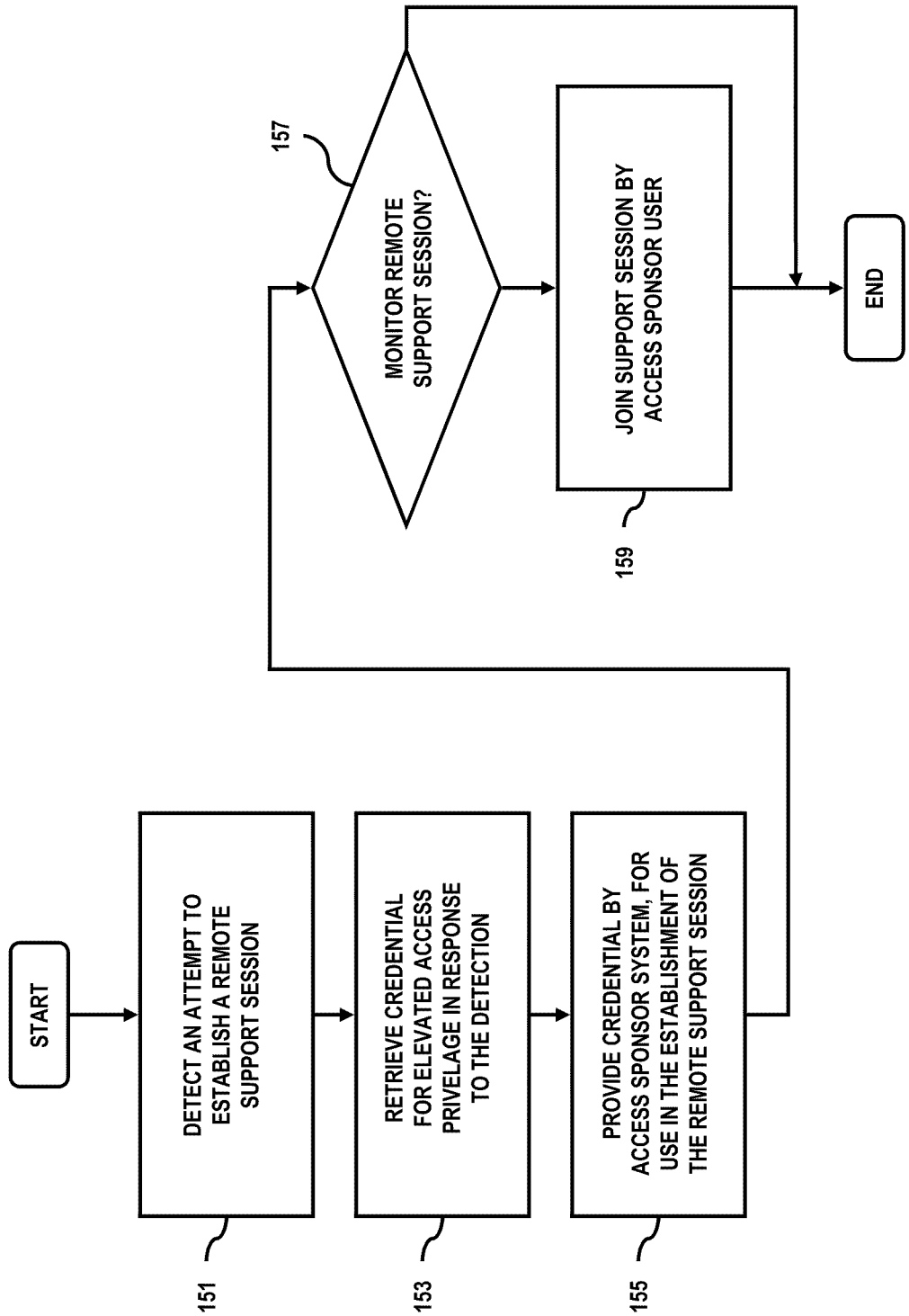

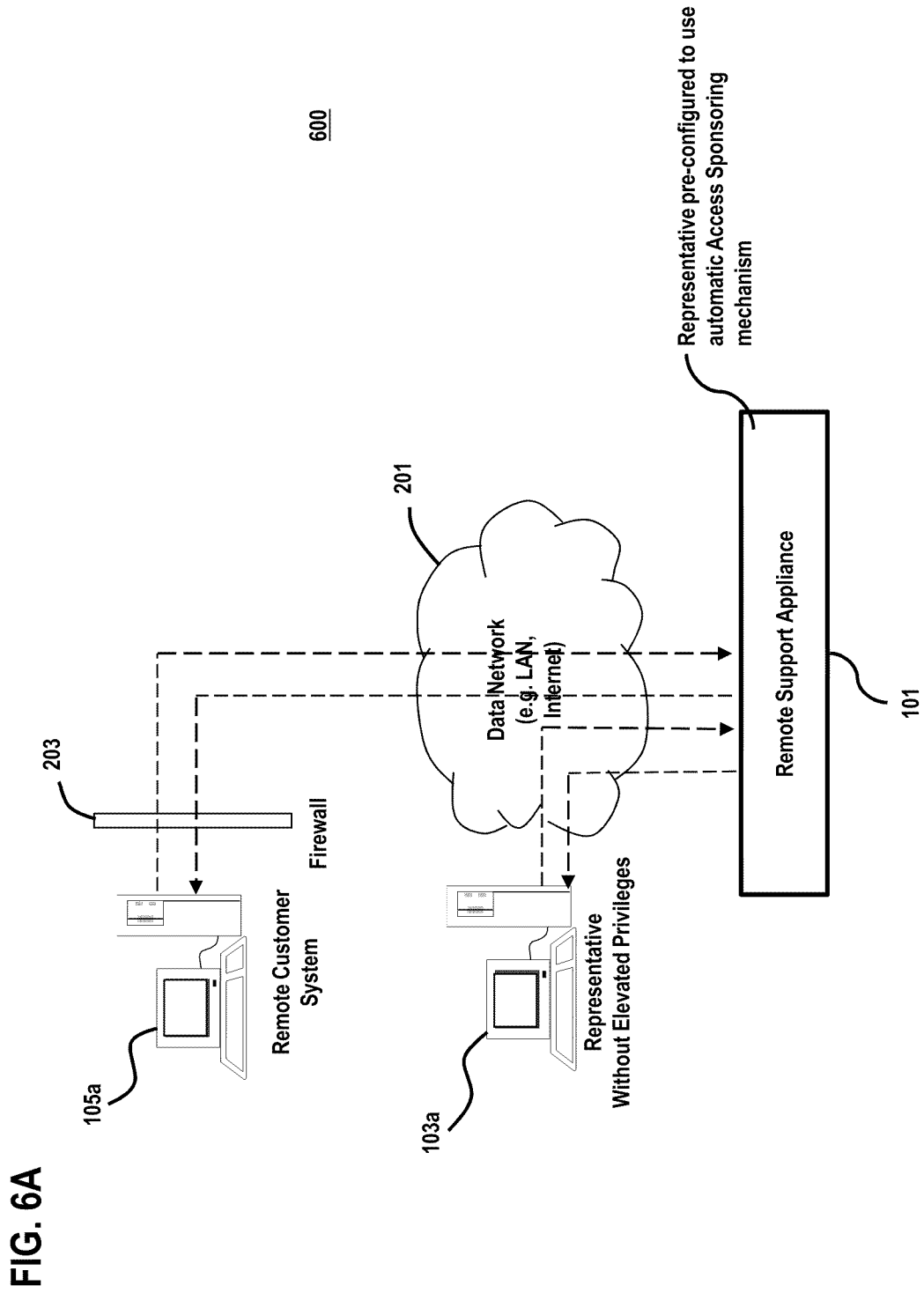

METHOD AND APPARATUS FOR SECURELY PROVIDING ACCESS AND ELEVATED RIGHTS FOR REMOTE SUPPORT

RELATED APPLICATIONS

This application claims the benefit of the earlier filing date under 35 U.S.C. §119(e) of U.S. Provisional Application Ser. No. 61/166,966 filed Apr. 6, 2009, entitled "Method and Apparatus for Securely Providing Access and Elevated Rights for Remote Support"; the entirety of which is incorporated by reference.

BACKGROUND OF THE INVENTION

Information Technology (IT) companies and departments who support their customers' computer systems are constantly challenged with the need to provide timely and cost-effective support to their customers. Remote support provides the means for IT professionals to remotely access and to control customers' computer systems. This eliminates the need for the IT professionals to travel on-site to fix a problem and the delays in response time.

Within the context of remote support and remote access, the right amount of access and user privilege provided to a representative continues to be a problem. When a remote support representative is tasked to work on a remote system via a remote support session, adequate amount of privilege and rights to that remote system has to be granted in order for the representative to perform the troubleshooting and problem solving tasks. In addition, credentials to critical applications on the remote system have to be provided in order for the representative to gain access to them.

Some conventional approaches require the representative to be provided a set of credentials that grant more privileges than the representative would need for most remote support scenarios. This is due to the need to cover specific support scenarios where this representative would need the elevated privileges and rights or credentials for critical applications. Providing a set of credentials with elevated privileges or credentials which provide access to critical applications to representatives at all times presents security risks to systems of the organizations receiving support.

Based on the foregoing, there is a clear need for approaches that provide remote support and access, while minimizing security risks.

BRIEF DESCRIPTION OF THE DRAWINGS

FIGS. 1A and 1B are, respectively, a diagram of a system providing an access sponsor that utilizes a request mechanism for distributing elevated rights for a remote support session, and a flowchart of the process for providing the elevated rights, according to various exemplary embodiments;

FIGS. 6A and 6B are, respectively, diagrams of a system and associated process for an access sponsor to provide pre-configured automated distribution of elevated privileges involving a representative, according to certain embodiments;

DESCRIPTION OF THE PREFERRED EMBODIMENT

An apparatus, method, and software for securely providing access and elevated rights for a remote support and management system are described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various embodiments of the invention are described with respect to a wired network, it is contemplated that these embodiments have applicability to other networks including wireless systems.

Figure 1A:
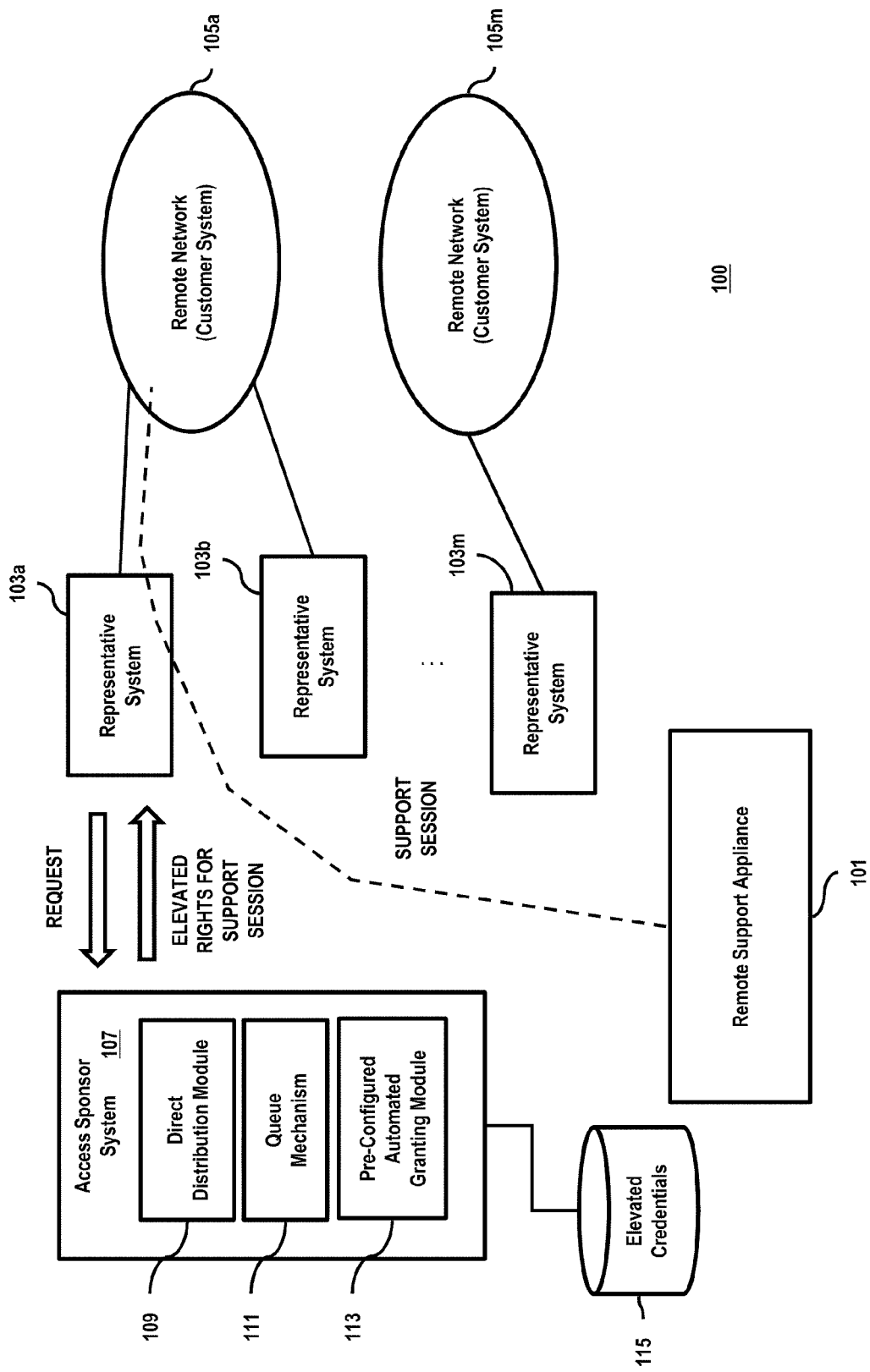

FIGS. 1A and 1B are, respectively, a diagram of a system providing an access sponsor that utilizes a request mechanism for distributing elevated rights for a remote support session, and a flowchart of the process for providing the elevated rights, according to various exemplary embodiments. A system 100, in accordance with certain embodiments, provides a methodology where a set of credentials with restricted privileges (or rights) can be provided to the support representatives for general use and a mechanism for requesting to gain access or elevated rights and privileges to systems being worked on in an ad-hoc manner either via a request system or a predefined automated mechanism. In addition, the mechanism which provides the elevation of rights and privileges further isolates the need for the representative to know the actual credentials which provides the access or elevated rights and privileges.

For the purposes of illustration, system 100 (FIG. 1A) is described with respect to a remote support service (e.g., technical support), as facilitated by a remote support appliance (or network appliance) 101, among one or more representative systems 103a-103n and a customer systems within remote networks 105a-105n. The remote support appliance 101, among other functions, is configured to provide remote access and control by the representative system 103 of the customer system 105, thereby enabling, for example, direct control and management of remote PC (personal computer) or remote server support (not shown). Thus, the appliance 101 is also referred to herein as a remote access and control appliance. According to one embodiment, the appliance 101 can be implemented as a standalone hardware device; alternatively, the appliance 101 can be virtualized—i.e., virtual appliance.

As shown, system 107 provides access sponsorship services. Specifically, this access sponsor system 107 can supply the appropriate credentials for the elevation of rights or privileges to enable successful establishment of the remote support sessions. Although shown as a separate, standalone system, access sponsor system 107 can be implemented as a module within other network elements, such as the remote support appliance 101 as later described. In one embodiment, an access sponsor can be an individual or an entity that grants these representatives access or elevated access rights either via a manual response to a request or an automated pre-configured granting of elevation of rights. The granting of these elevated privileges can be handled through a variety of methods according to the following modules: a direct distribution module 109, a queue mechanism 111, and a pre-configured automated granting module 113. The direct distribution module 109 can accept explicit requests from users (e.g., support representatives) for credentials corresponding to the elevated rights, and selectively grant the requests directly with the users. Alternatively, the queue mechanism 111 can implement a scheme whereby requests are queued to receive grants according to any number of schemes. In yet another embodiment, the automated granting module 113 can issue the credentials automatically upon detecting an establishment procedure for the remote support session. Access sponsor system 107 can also maintain a database 115 for storing the credentials for the elevated privileges. It is contemplated that the modules 109-113 can be implemented in any combination as individual or separate components.

According to one embodiment, the operation of the access sponsor system 107 is depicted in FIG. 1B. In step 151, the process detects an attempt to establish (or that a session has been established and is on-going) by a representative system (or device) 103a a remote support session with remote network 105a via the remote support appliance 101. In one embodiment, the access sponsor system 107 employs a request based approach. Under such a scenario, a set of access sponsors or agents are pre-configured to provide the access or elevation assistance to a related group of remote support representatives. When an access or elevation of rights is required by the support representative on a remote system being serviced, this representative can execute a request for access or elevation for transmission to access sponsor system 107 through the direct distribution module 109. That is, the elevation assistance request is handled by the access sponsors in a direct manner; in the alternative, such request can be processed via the queue mechanism 111. Per step 153, the appropriate credential for the elevated access privilege corresponding to the remote system 105a is retrieved or otherwise determined in response to the detection of the attempt to establish the remote support session. In step 155, the retrieved credentials are provided to the representative for use in the establishment of the remote support session (in the case that no such session exists).

According to one embodiment, the access sponsor can choose to enter the proper elevated credentials (without exposing the credentials to the support representative) to gain proper elevation to the support session either by joining the actual support session to have full view of what is being done after elevation or by simply entering the credentials for elevation without joining the session. Hence, the access sponsor has the option to join the actual support session and remain on the support session in order to monitor the activities between the support representative and the end user as well as ensure proper use of elevated rights provided to the support representative (per steps 157 and 159). In this manner, the support representative is not provided with privileges that are overboard for a particular task or purpose.

Figure 2:
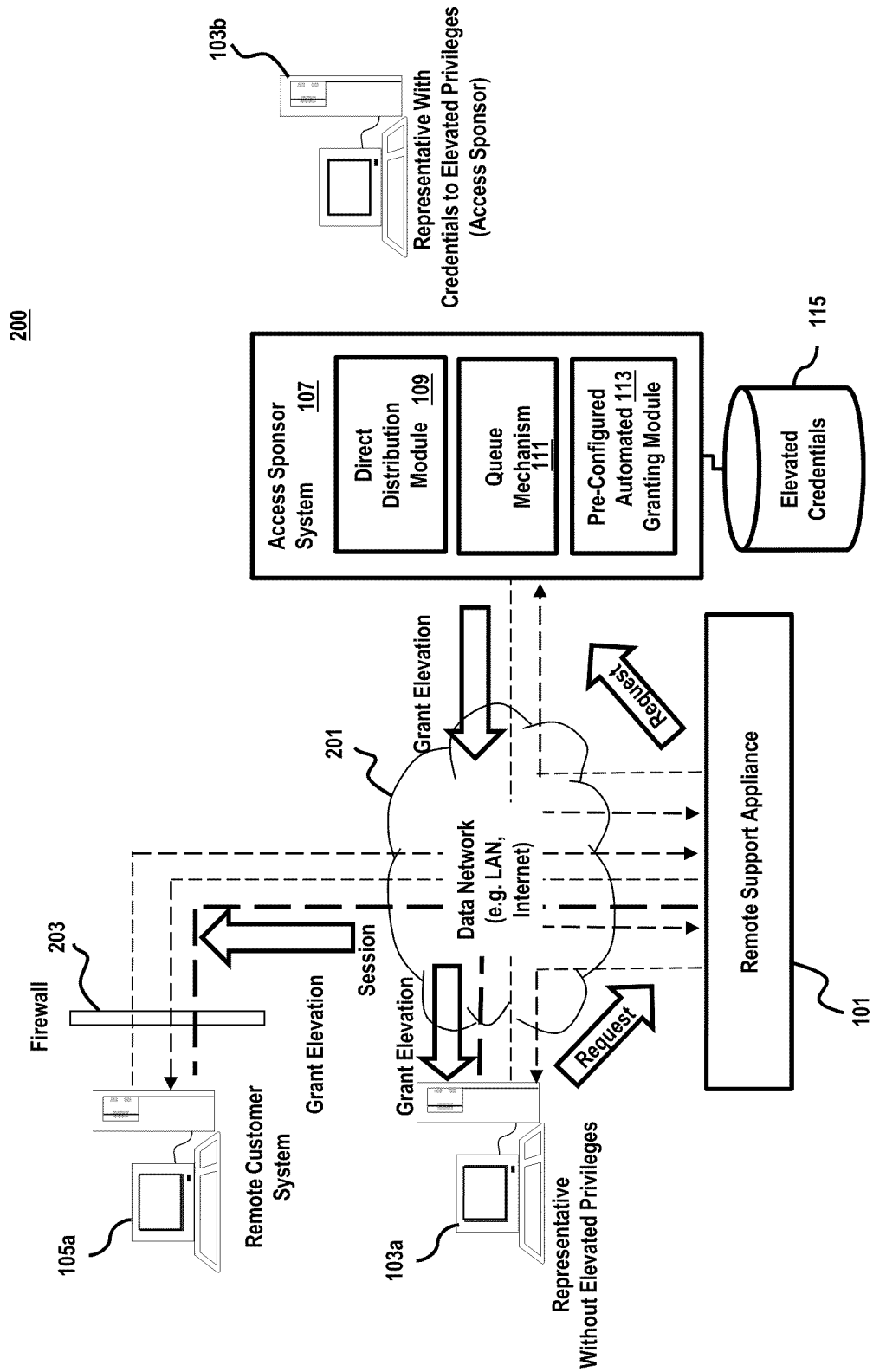
FIG. 2 is a diagram illustrating the interaction between a remote support appliance and an access sponsor system, according to an exemplary embodiment.

FIG. 2 is a diagram illustrating the interaction between a remote support appliance and an access sponsor system, according to an exemplary embodiment. In system 200, access sponsor system 107 communicates with the remote support appliance 101 over a data network 201—e.g., local area network (LAN). The representative system 103 provides, in certain embodiments, a remote support mechanism that is secure and implemented in a turnkey fashion to one or more remote customers systems 105 over the data network 107 using the network appliance 101. Under this scenario, representative system 103a is assumed to be without privileges to access remote customer system 105a, while representative system 103b possesses the credentials for elevated access privilege to establish remote support sessions with remote customer system 105a. As seen, system 103a generates a request for the elevated rights and is forwarded via the remote support appliance 101 to access sponsor system 107, which then sends a grant for the elevated rights to the system 103a. Consequently, a remote support session can then be securely established between representative system 103a and remote customer system 105a through firewall 203.

By way of example, the data network 107 can be an internetwork, such as the global Internet, or a private network. The traffic between the representative system 103 and any customer system 105 is handled and managed at the network appliance 101. In an exemplary embodiment, the network appliance 101 is managed by an administrator, who can access the appliance 101 using a graphical user interface (GUI), such as a web interface. The remote support appliance 101, thus, has the capability of allowing on demand product use from anywhere in the world. For example, as long as the remote support appliance 101 is deployed accessible via a known network address (e.g., public Internet Protocol (IP) address), a support representative can log into his/her account via the web interface hosted on the appliance 101 to enable the support service functions.

The appliance 101, according to an exemplary embodiment, is a rack-mountable device (e.g., 1U) that can be installed and deployed at the representative's organization or site; in this manner, data security is in full control of the representative's organization.

The remote access and control appliance 101 also enables the administrator to change settings (configuration parameters) on the appliance 101 itself, in addition to the software it contains. The appliance 101 also provides management functions including the management of one or more representatives via the web interface. After physical installation of the appliance 101, the administrator may log on to the appliance via the web interface by using the appliance's public Uniform Resource Locator (URL) address.

In an exemplary embodiment, the representative system 103*a* can communicate with the customer system 105*a* using the appliance 101 via the web interface 111 through one or more firewalls 203 over secure links. In one embodiment, the security on these links is achieved using the 256-bit Advance Encryption Standard (AES) Secure Sockets Layer (SSL). The firewall(s) 203 may be implemented the remote customer's site, at the representative's site, or at both sites. Alternatively, no firewall exists at either site. According to one embodiment, the representative system 103*a* and the customer system 105*a* connect outbound to the appliance 101, thereby eliminating firewall incompatibilities.

Figure 3A:
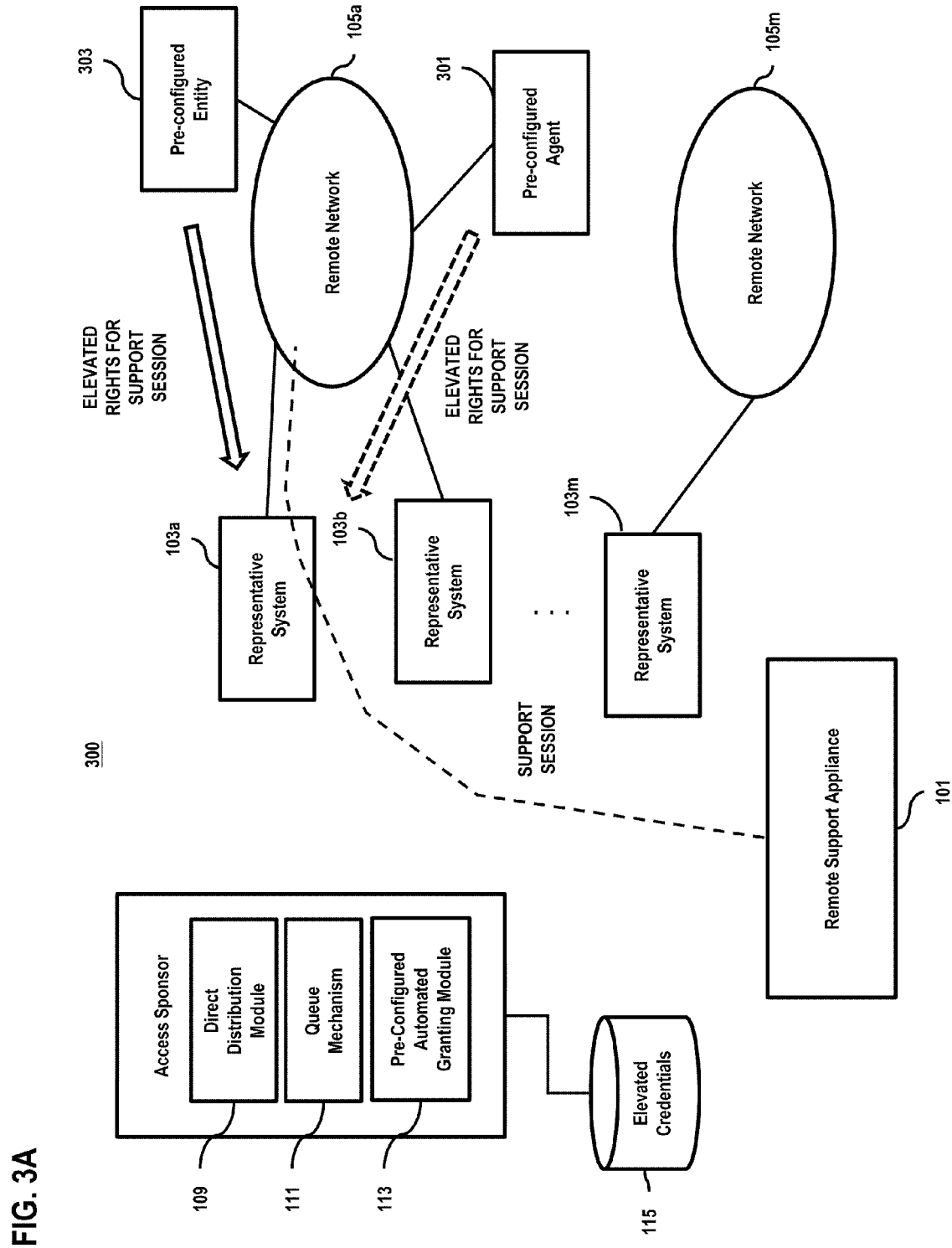
FIGS. 3A and 3B are, respectively, a diagram of a system providing an access sponsor that utilizes a pre-configured agent or entity for automatically distributing elevated rights for a remote support session, and a flowchart of the process for automatically providing the elevated rights, according to various exemplary embodiments.
Figure 3B:
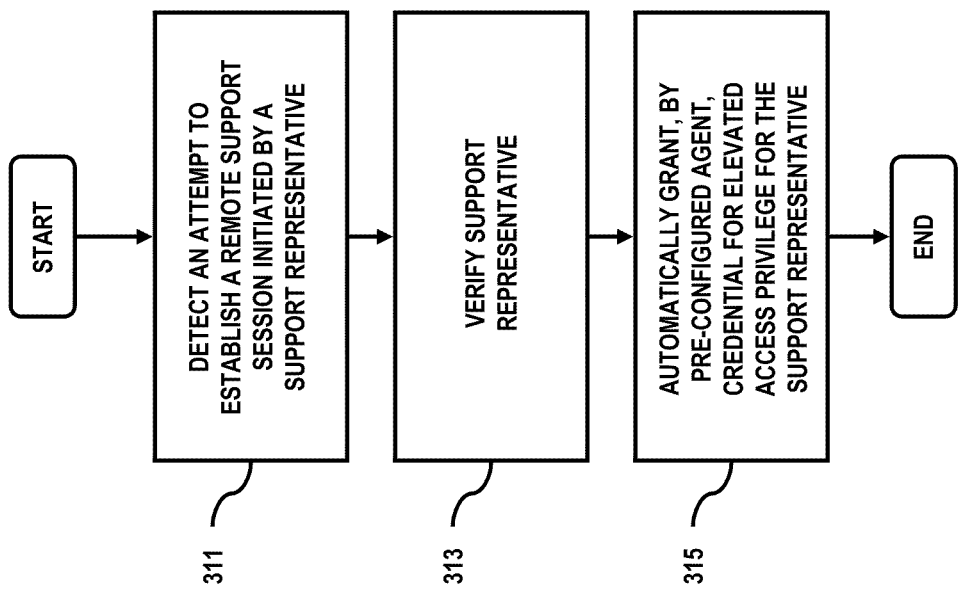

FIGS. 3A and 3B are, respectively, a diagram of a system providing an access sponsor that utilizes a pre-configured agent or entity for automatically distributing elevated rights for a remote support session, and a flowchart of the process for automatically providing the elevated rights, according to various exemplary embodiments.

There are scenarios where support representatives have a need for remotely accessing attended or unattended systems; and the mechanism for accessing these remote systems require elevated credentials at the stage of establishment of the remote support sessions. According to certain embodiments, an automated access sponsoring mechanism can be preconfigured to provide this assistance in elevation of rights.

As shown in FIG. 3A, in system 300, access sponsoring is provided via a pre-configured agent 301 or a built-in component within the remote support appliance 101. In other words, this automated access sponsoring mechanism can involve either a software agent deployed in a remote or local network environment or the built-in functionality of the remote support appliance 101 to assist in providing the elevation of rights needed for the support session. The agent 301 or the built-in component can be pre-configured to procure or own a valid set of elevated credentials that can be used (without exposing the actual credentials) for a pre-configured set of support representatives who are allowed to use this agent.

Alternatively, or in addition to, access sponsoring is provided via a pre-configured entity 303. The entity can be preconfigured to automatically use a predefined set of elevated credentials when requested against. The groups of support representatives can be provisioned to be allowed to use this automated access sponsoring mechanism.

Continuing with the example of FIG. 3A, the operation of system 300 is as follows (FIG. 3B). In step 311, an attempt by a support representative (e.g., representative 103*a*) to establish a remote support session is detected. The support representative is verified, as in step 303, e.g., pre-configured agent 313. Thereafter, the process automatically grants—e.g., by agent 301—the credentials for the elevated access privilege or right for the support representative, per step 315.

Figure 4:
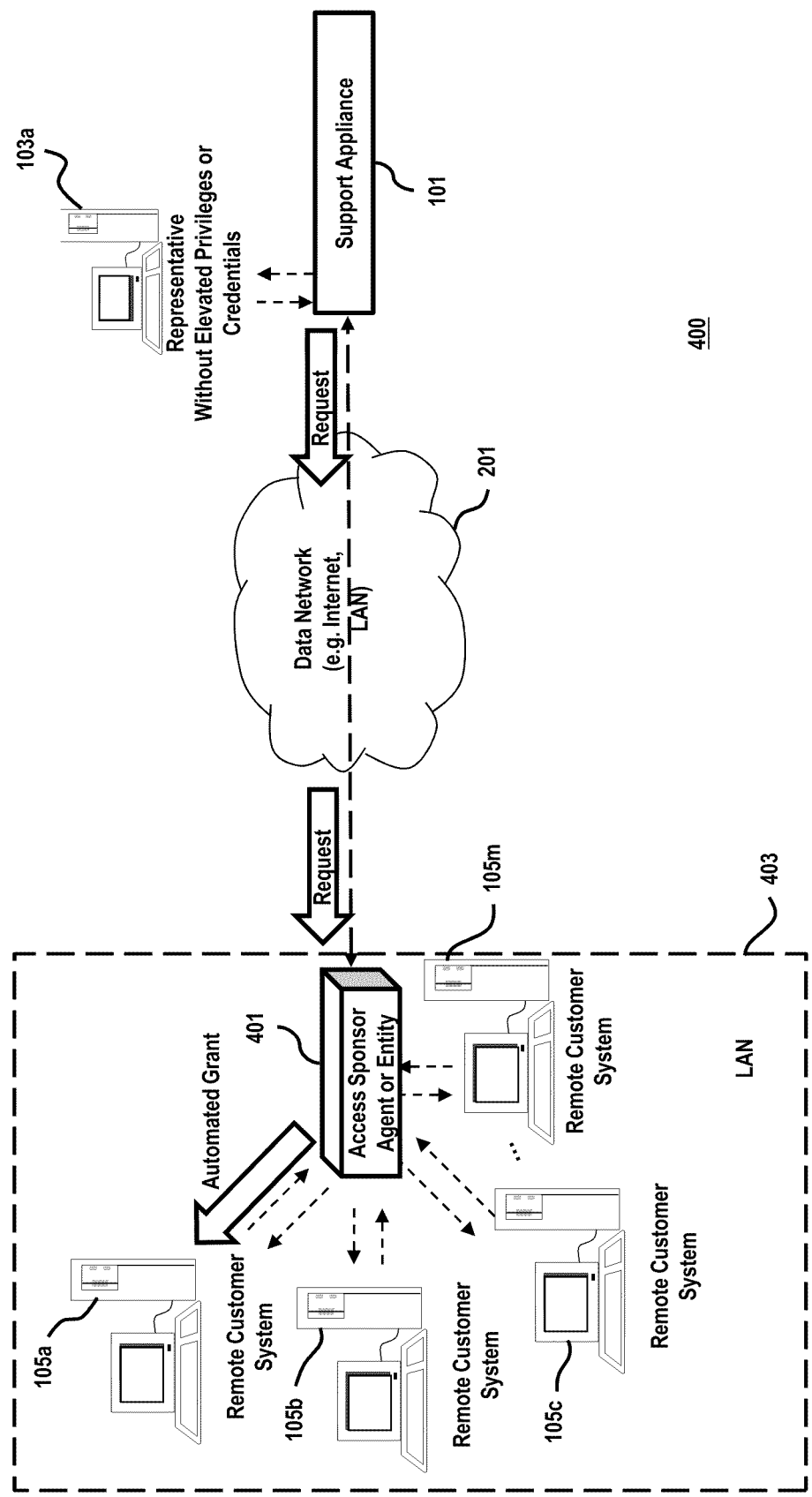
FIG. 4 is a diagram illustrating use of an access sponsor within a local area network (LAN) of a customer, according to an exemplary embodiment.

FIG. 4 is a diagram illustrating use of an access sponsor within a local area network (LAN) of a customer, according to an exemplary embodiment. In this exemplary system 400, an access sponsor agent or entity 401 is deployed within a LAN 403 of a customer site. Under this scenario, representative system or device 103*a* communicates with support appliance 101 to generate a request for elevated privileges to assist remote customer system 105*a*, which receives an automated grant for establishing a remote support session.

It is noted that various configurations exist for different network elements to assume the role of access sponsor, as explained with respect to FIGS. 5-8.

To better appreciate the access sponsoring mechanism, it is instructive to first describe remote support and management in general.

Enterprises (or organizations) have many challenges when receiving support from a technology vendor via remote control or remote access technologies. When a system or application requires support and maintenance from a vendor, the vendor must be granted access in order to service the system or application effectively. Often, each technology vendor uses a different product, leaving the organization receiving support with little or no control over what remote access or remote control technologies are used. Most remote access and remote control tools support only "all or nothing" access, resulting in the vendor having much greater access than is required. Because of this, the organization receiving support does not have the ability to granularly control the permissions, access, and privileges granted to the technology vendor. Moreover, existing approaches do not record the activity of the technology vendor in the process of supporting the organization that is receiving support. In other words, support incidents do not have audit trails. This lack of control, and lack of audit-ability undermines the compliance posture of the organization receiving support, thereby increasing the liability associated with receiving technology support from a vendor.

Figure 5A:
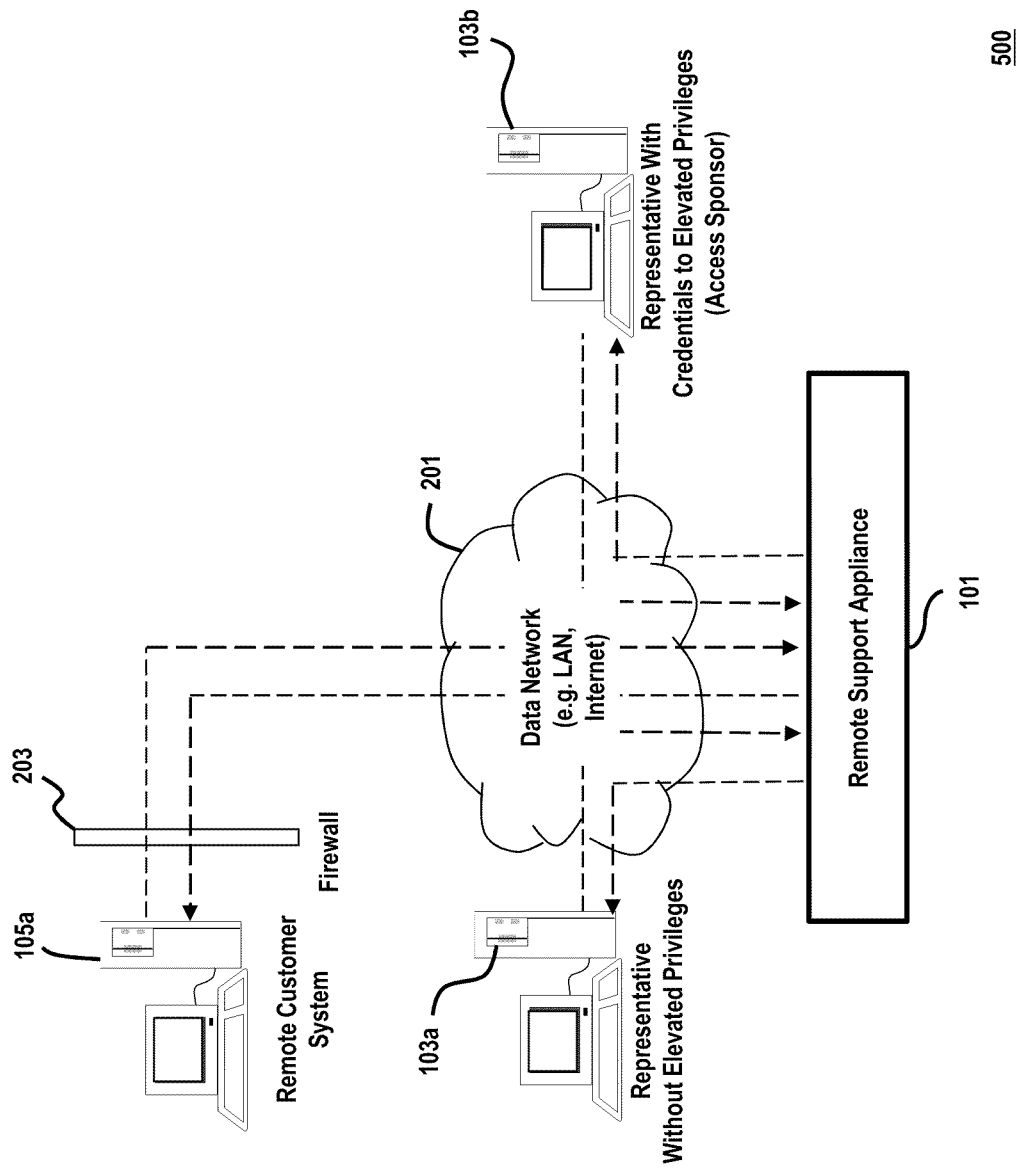
FIGS. 5A and 5B are, respectively, diagrams of a system and associated process for an access sponsor to provide elevation of privileges involving a representative, according to certain embodiments.
Figure 5B:
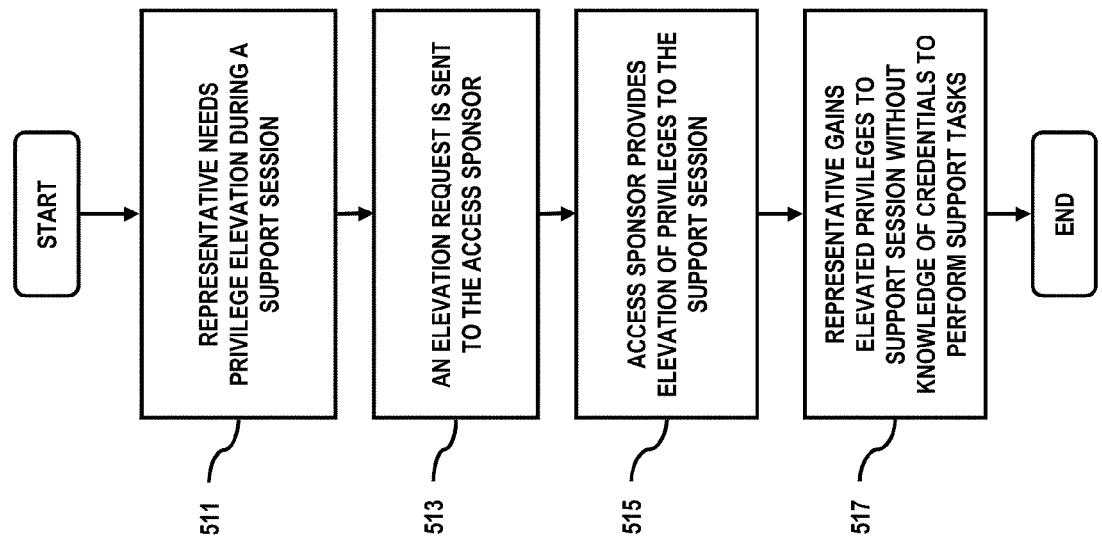

FIGS. 5A and 5B are, respectively, diagrams of a system and associated process for an access sponsor to provide elevation of privileges involving a representative, according to certain embodiments.

For the purposes of illustration, in system 500, the appliance 101 can be deployed by a customer or a vendor and accessed by a vendor or various vendors, and is referred to as a "support appliance." In this example, the functions of the access sponsor system 107 can be assume in part or in totality by representative system 103*b*, which is assumed to possess elevated privileges. The deployed appliance 101 can serve as a remote support and management system for the organization that is receiving support from the vendor. In one embodiment, the appliance 101 is implemented according to an onsite deployment model. A hosted Software-as-a-Service (Saas) model can also be an offering of this approach where the customers' as well as the vendors' self administered solutions can be in a hosted infrastructure. In addition, as mentioned, the appliance 101 can be further defined as a physical or virtual computing system; this can include, but is not limited to, a server rack-mountable server, non-rack-mountable server, desktop computer, laptop computer, and virtual machines.

In one exemplary embodiment, the remote support appliance 101 is a rack-mountable (e.g., 1U) network appliance that can be installed and deployed at customers' site; in this manner, data security is in the customers' full control. The appliance 101 can operate through firewalls (e.g., firewall 203) and proxy servers (not shown).

Additionally, the remote access and control appliance has the capability of allowing on demand product use from anywhere in the world. For example, as long as the network appliance 101 is deployed accessible via a public IP address, a support user can log in his/her account via a web interface hosted on the network appliance 101.

A Representative Client (local client) can be downloaded from a web interface to provide remote access or support. Also, a Customer Client (remote client) can be downloaded by submitting an incident by visiting a support portal web interface—which can also be hosted on the network appliance 101.

The network appliance 101, in various embodiments, execute software applications that can receive, handle, manage, and dispatch system or data messages to and from the Representative and Customer Clients via a secure connection (e.g., 256-bit Advance Encryption Standard (AES) Secure Sockets Layer (SSL)).

FIG. 5B shows a process in which elevated privileges can be obtained during a support session, according to one embodiment. Continuing with the example of FIG. 5A, in step 511, representative system 103a requires elevation of its access privileges during a remote support session with remote customer system 105a. By way of example, such elevation of rights may be necessary to access particular data or functions within remote customer system 105a. Accordingly, in step 513, an elevation request is generated and sent by the representative system 103a to the access sponsor, which in this example, representative system 103b. After confirming or verifying the request, the access sponsor, as in step 515, may provide such privileges in form of a grant in response to the request. As in step 517, the requesting representative thereby gains elevated privileges without actually learning of the credential information to perform the support tasks at hand.

Figure 6B:
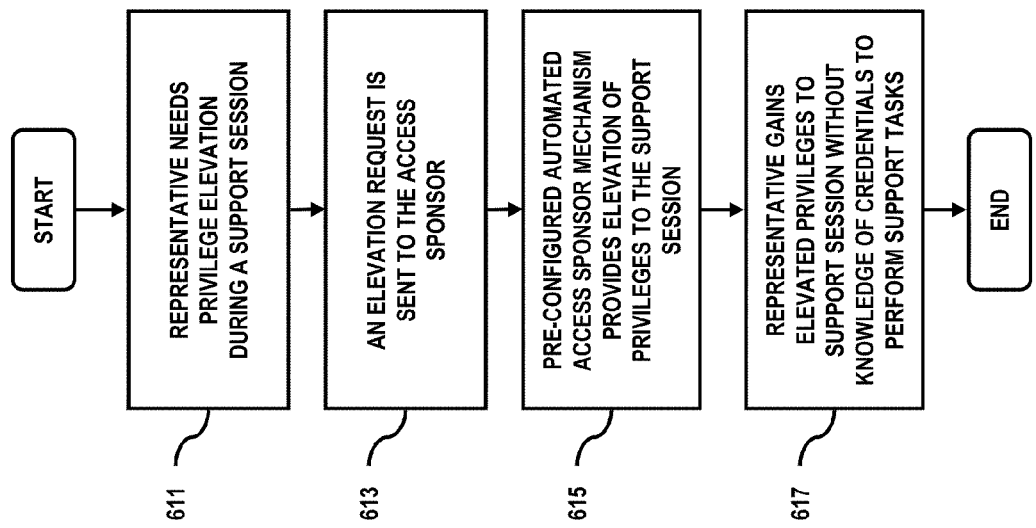

FIGS. 6A and 6B are, respectively, diagrams of a system and associated process for an access sponsor to provide pre-configured automated distribution of elevated privileges involving a representative, according to certain embodiments. In one embodiment, the role of access sponsor can be executed by the remote support appliance 101 itself, as shown in system 600. Specifically, appliance 101 can be pre-configured to use an automatic access sponsoring mechanism, as described previously. In this manner, (as shown in FIG. 6B), representative system 103a requires elevation of its access privileges during a remote support session with remote customer system 105a, per step 611. In step 613, an elevation request is generated and sent by the representative system 103a to the access sponsor. Under this scenario, appliance 101 includes an access sponsor module to execute the functions of an access sponsor; thus, the request is processed by the appliance 101. Next, in step 615, the appliance 101, as the access sponsor, can perform a pre-configured automated access sponsor mechanism to provide the credentials to the requesting system 105a for elevation of rights pertaining to the system 105a. Such credentials can remain unknown to the requesting system 105a, when provided to system 105a (as in step 617).

Figure 7A:
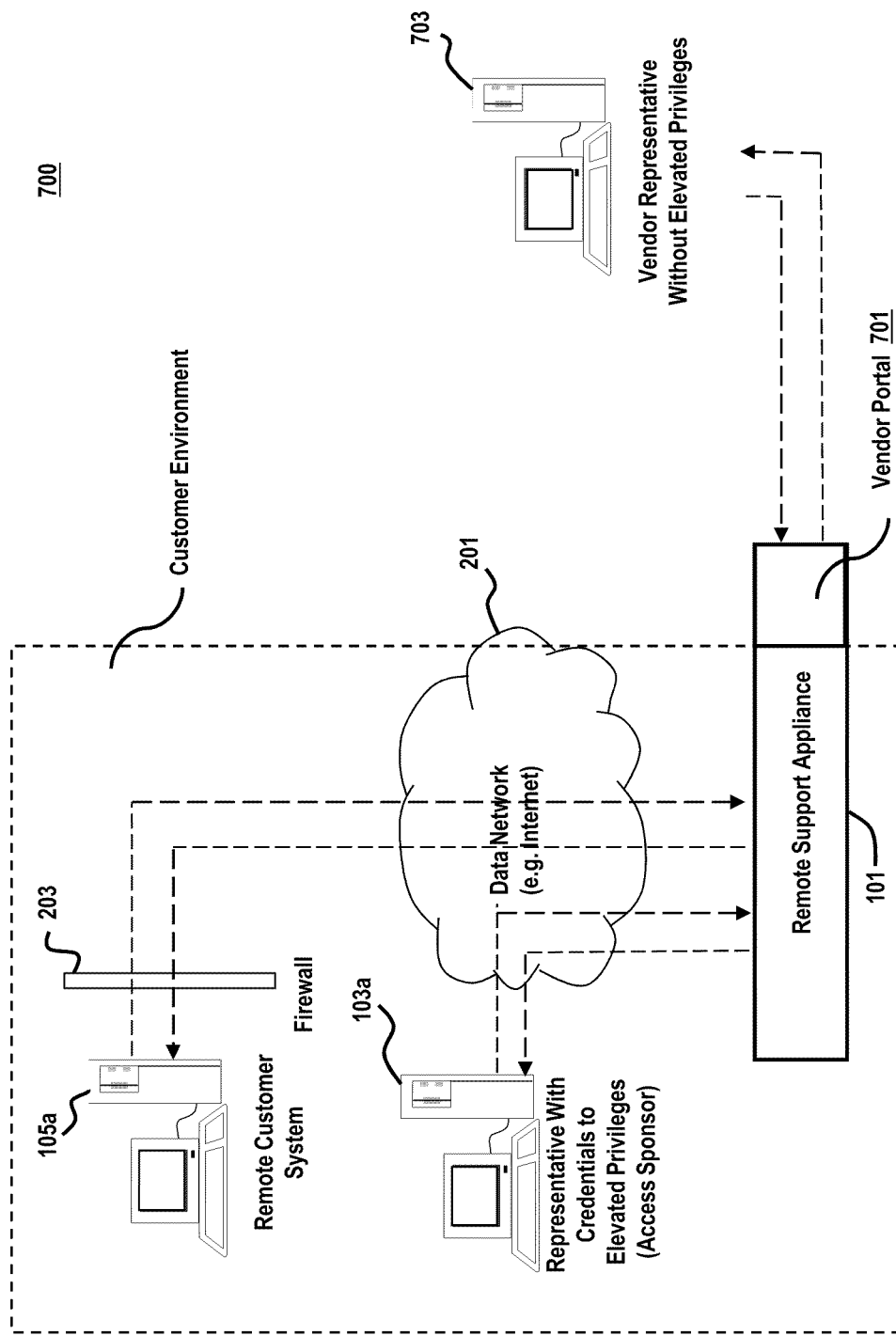
FIGS. 7A and 7B are, respectively, diagrams of a system and associated process for an access sponsor to provide elevation of privileges involving a vendor representative, according to certain embodiments.
Figure 7B:
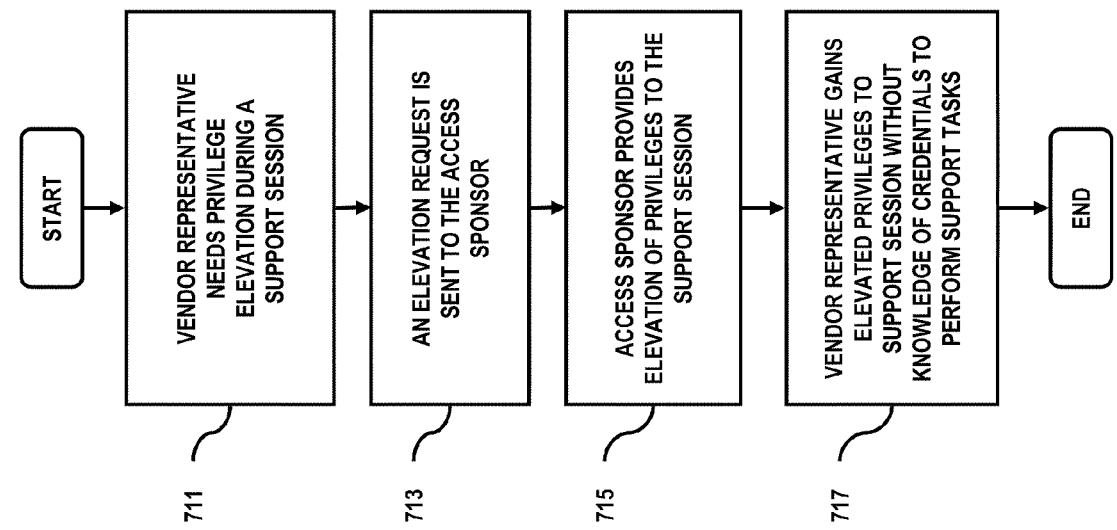

FIGS. 7A and 7B are, respectively, diagrams of a system and associated process for an access sponsor to provide elevation of privileges involving a vendor representative, according to certain embodiments. In system 700, a vendor representative system communicates with the appliance 101. The traffic between the local and remote systems is handled and managed at the network appliance 101. In certain embodiments, an organization can create one or more vendor portals 701 for providing remote access and remote control by the vendor to internal systems and applications of the organization. For example, the organization can then administer their vendor agents' security policies that control access rights, remote control permissions, and other parameters and guidelines. Consequently, the vendor support agents are provided with only the level of access to the organization's systems that is required to service the systems effectively. In one embodiment, all activities relating to vendor remote access and remote control through the vendor portals 701 are recorded and can be audited to ensure compliance with the organization's regulations. Under this arrangement, an organization can receive support from one or more technical vendors, while maintaining complete control over the vendor's level of access as well as a complete audit trail of the vendor's activity. This decreases the organization's liability associated with receiving technology support from a vendor.

With respect to FIG. 7B, continuing with the example of FIG. 7A, in step 711, a vendor representative system 703 requires elevation of its access privileges during a remote support session with remote customer system 105a. In step 713, an elevation request is generated and sent by the representative system 703 to the access sponsor. Under this scenario, representative system 103a is an access sponsor, and thus, receives an elevation request from system 703 (as in step 715). In step 717, the access sponsor 103a may provide elevated privileges in form of a grant in response to the request. Next, the requesting representative 703 thereby gains elevated privileges without knowledge of the requisite credential information to perform the support tasks at hand.

In addition to providing a secure means for an organization to receive support from a technology vendor, this vendor remote support and management system can be extended to enable the technology or technology services vendor to support their other customers more securely and efficiently through establishing a connection between the vendor's remote support system and their customers' remote support system vendor portals 701. For example, the customers of the organization can themselves utilize the remote support and management system; accordingly the organization's system can connect to its customers' remote support and management system via their respective vendor portals 701.

In this manner, the vendor can create and administer support agent accounts for their own system. The vendor's support agents can then log into their own secure and self-administered system, and then, through an established connection to their customer's secure and self-administered system's vendor portal, the reps can gain access to the customer's systems and applications. In this way, both the organization receiving support and the technology vendor can administer their own approaches. However, even though the support solutions are connected, the organization receiving support has complete control over the permissions of the vendor's support agents when those agents are accessing the organization's systems and applications. With connected vendor remote support and management systems, the vendor organization can administer its own support agents and easily remotely access its customers' systems and applications, while at the same time giving its customers complete control over vendor's access permissions and complete visibility into the vendor's activity. Additionally, connected appliances provide both the vendor and the organization receiving support auditable reports on support agent activity and reports of support agent performance.

System 700 thus provides a standardized, secure vendor remote support and management system, whereby the system 700 provides a means not only for giving support to users and customers, but also a means of receiving support from their vendors.

In one embodiment, the vendor portal 701 can also be extended to serve as a proxy for all attended (when an end user is present) as well as unattended (when an end user is not present) support. In an unattended scenario, the vendor portal 701 can be used as a mechanism to push a remote support executable to an end system and/or used as a mechanism to initiate a pre-installed client to establish a remote support session back to the support agent. For preinstalled clients, this vendor portal 701 can also serve as an agent to collect data and statuses related to the remote systems (e.g., system 105a). The data can be later synchronized with a connected vendor remote support and management system. For systems that are not connected to a public data network (e.g., Internet), this vendor portal 701 can also serve as a proxy for all remote access and remote control data, enabling a technology vendor to support systems over the internet even if the supported systems are not directly connected to the internet.

According to one embodiment, the vendor portal 701 can also be used to conduct training.

Furthermore, it is noted that the self administered customer's vendor remote support and management system can serve as a vendor's vendor remote support and management system. Hence, a customer can be a vendor, and vice versa.

By way of illustration, the following scenarios are described for deployment of the vendor remote support and management appliance: (1) ad-hoc vendor remote support; (2) unmediated vendor remote support and management; and (3) vendor portal as an agent and a proxy.

With respect to ad-hoc vendor remote support, it is recognized that an internal support agent sometimes requires third-party assistance in providing support to an internal or external end-user or system. In this scenario, a request for assistance is sent to the vendor support agent and access privileges to the end system are granted ad-hoc. The vendor or third party support agent downloads the remote support application used for providing support, logs on with provided valid credentials or without requiring credentials, and joins or views the remote support session to assist the internal support agent in troubleshooting or supporting the end system. The internal support agent may be present throughout the remote support session or leave the remote support session after the vendor support agent joins the session.

Figure 8A:
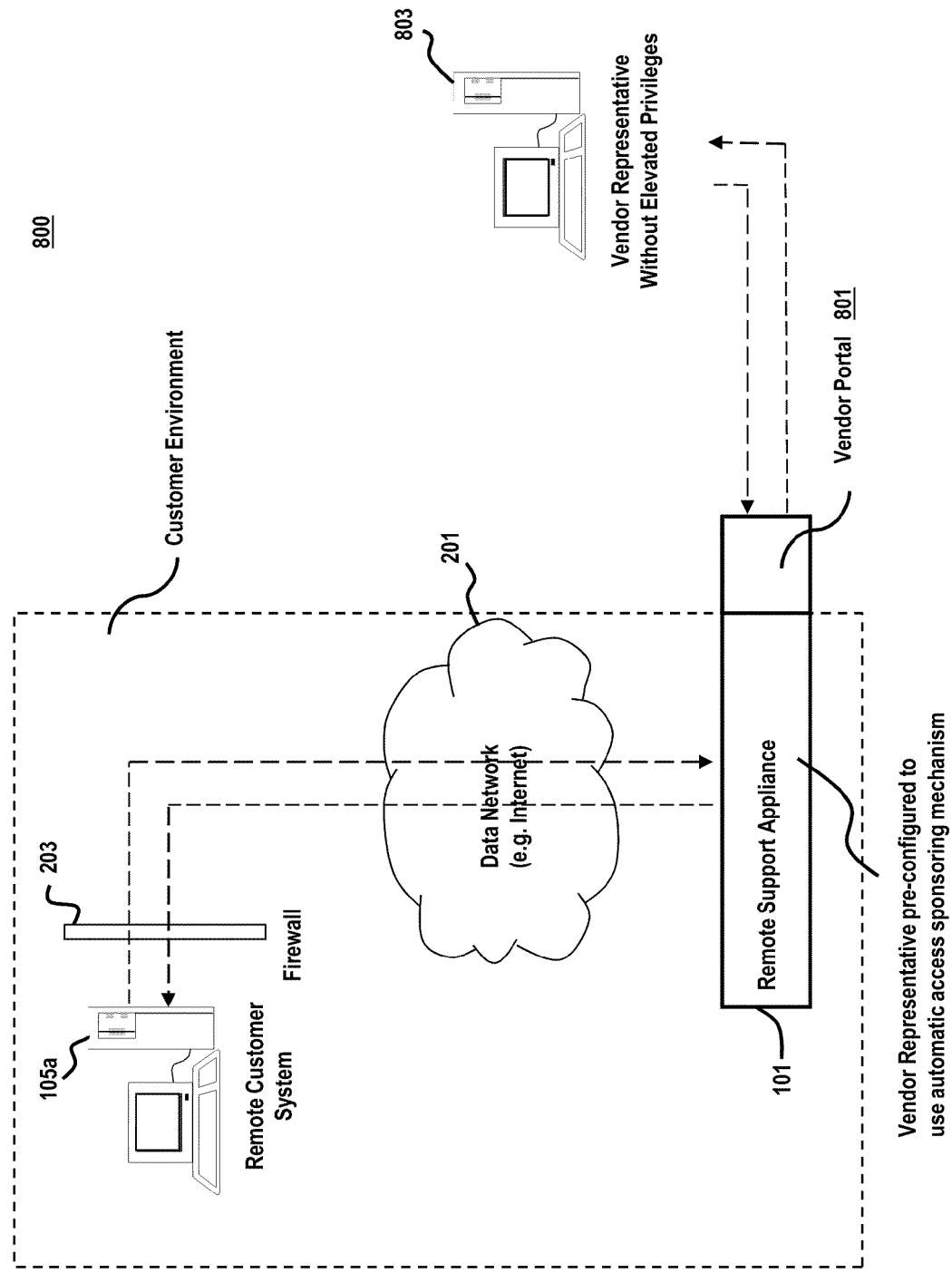
FIGS. 8A and 8B are, respectively, diagrams of a system and associated process for an access sponsor to provide pre-configured automated distribution of elevated privileges involving a vendor representative, according to certain embodiments.
Figure 8B:
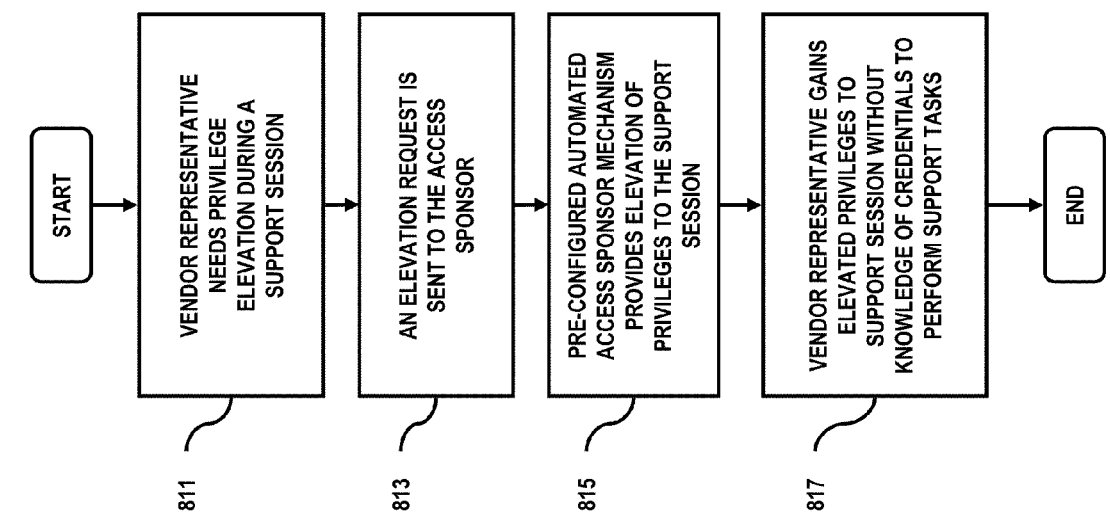

FIGS. 8A and 8B are, respectively, diagrams of a system and associated process for an access sponsor to provide pre-configured automated distribution of elevated privileges involving a vendor representative, according to certain embodiments. For the scenario of system 800, a vendor support agent requires unmediated access to an organization's systems and applications. This level of access can be enabled by creating a vendor portal 801 that controls access privileges and permissions. With this vendor portal 801, the vendor support agent can provide attended or unattended remote support for the customer's systems and applications via remote access and remote control. A customer's vendor remote support and management system can have multiple vendor portals, in one embodiment.

By way of example, two approaches are described. One approach provides vendor presence on the customer environment. In this scenario, the vendor support agent accounts and restrictions are managed and provisioned on the customer's appliance 101. The customer administers a team of vendor support agent accounts that are used only by a specific vendor. The customer can create and administer multiple such teams for multiple vendors. The vendor support agents in this scenario use access credentials, privileges, and security policies set forth by the customer. This team created for vendor support agents serves as a component of the vendor presence on the customer system. The combination of team, restrictions, and access interfaces are components that make up the vendor portal in this scenario.

Regarding the operation of system 800 (as shown in FIG. 8B), the process for providing elevated rights resembles the process of FIG. 7B. In particular, per steps 811 and 813, a vendor representative system 803 requires elevation of its access privileges during a remote support session with remote customer system 105a, and an elevation request sent by the representative system 803 to the access sponsor. In this example, remote support appliance 101 includes the vendor portal 801 that is pre-configured to use an automatic access sponsoring mechanism, which provides the elevated privileges (step 815). In step 817, the representative 803 can perform tasks requiring the elevated rights.

In another approach, vendor presence is on the customer system through relationship with the vendor system.

Alternatively, the system can provide vendor presence on a customer appliance 101 via a vendor's appliance, according to certain embodiments. The vendor support agent accounts are managed and provisioned on the vendor's self administered system. The vendor portal 801 on the customer appliance 101 enables the customer to further manage, provision, and restrict the vendor support agents as a whole unit or entity which is connected to the vendor portal through the vendor appliance.

In one embodiment, a network of remote support systems with vendor presences through connection with vendor systems can be deployed. In such a scenario, a customer system can act as a vendor system; and a vendor system can act as a customer system if configured to do so (for example: a technology vendor may also be a customer to other technology vendors).

In certain embodiments, the vendor portal 801 on the customer appliance 101 can serve as an agent for both attended and unattended support scenarios. One such support scenario is through enabling a remote support application to be pushed to a remote system, executed, and connected back to the vendor support agent via the vendor appliance. For unattended systems that have been configured with a preinstalled remote support client, the vendor portal agent can serve as the collection agent for updates and statuses from the remote support client. The vendor portal agent can send these collective updates and statuses to the vendor appliance in a batched manner periodically. For attended and unattended support scenarios in which the end systems do not have access to a public data network (e.g., Internet), the vendor portal can serve as a proxy, enabling the vendor support agent to access end systems through the internet indirectly through the vendor portal even though the end systems do not have direct internet access.

Figure 9:
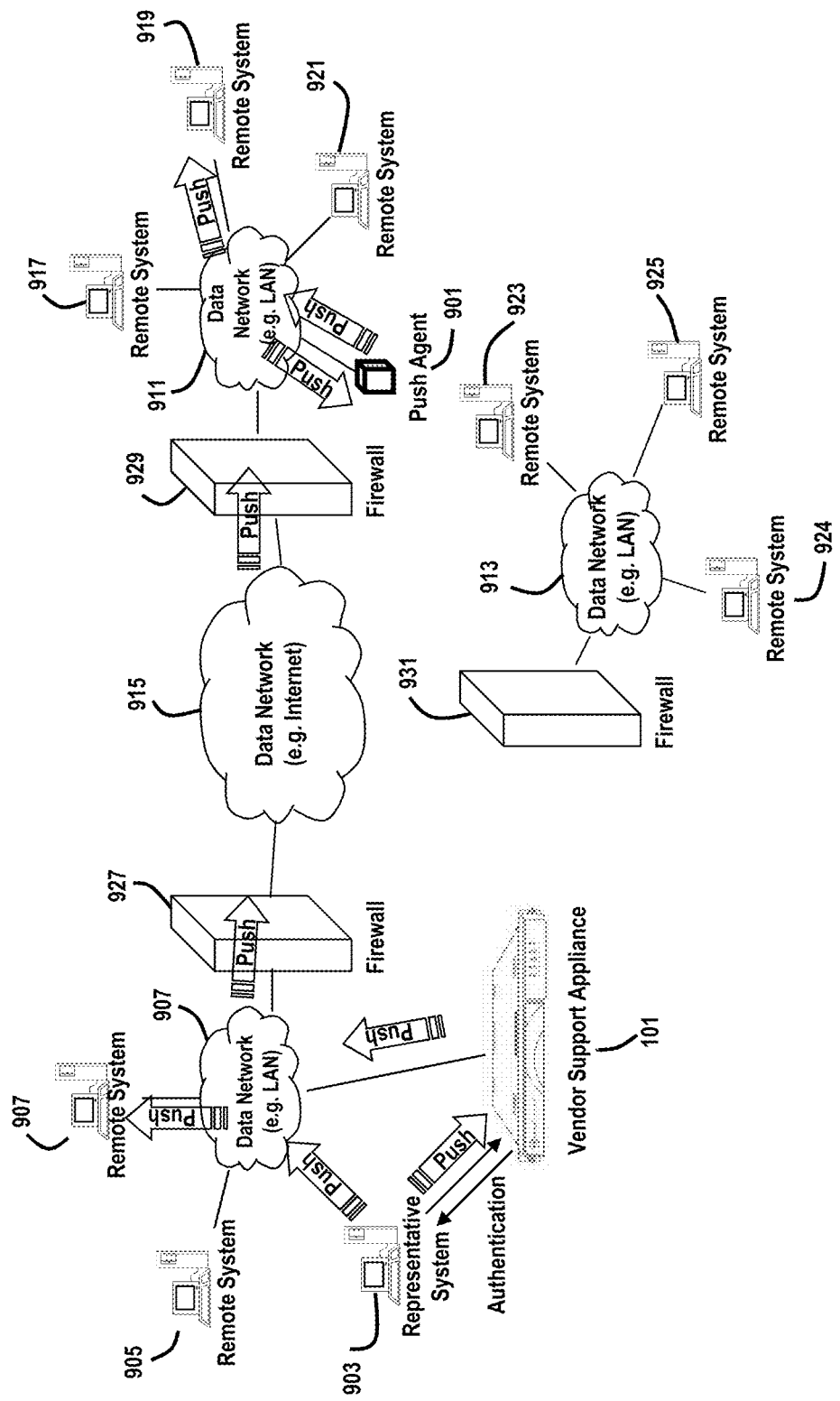
FIG. 9 is an illustration of a system capable of providing Push technology within a local area network (LAN) as well as within a remote network, according to an exemplary embodiment.

FIG. 9 is an illustration of a system capable of providing Push technology within a local area network (LAN) as well as within a remote network, according to an exemplary embodiment. Traditional remote support approaches using remote control and visualization application tool is one of the means to efficiently provide assistance to remote users. In addition to attended remote support, a means to remotely access or control unattended systems further improves the efficiency of support organizations. Without the need for pre-installed clients on a system, the Push and Start System can be used by the representatives of a support organization to transfer an application to an attended or unattended remote system and execute the application to establish a session connection back to the representative. The Push functionality provides reach to systems which are visible from within the network that the support representative's computer is connected to via a Local Push method and reach to systems within remote networks through a Push via a Push Agent mechanism.

Within an exemplary context of remote support by remote controlling or accessing another computer, "Push" is a feature that allows a support representative to transfer an application to a remote computer in need of support and have the application executed whereby enabling the support representative to then remotely control or access the remote computer. No interaction is required at the remote computer for the process to complete, but interaction may optionally be enabled that allows any user present at the remote computer to refuse access for whatever reason. The support representative may or may not be required to have or to enter authentication/authorization credentials to gain access to the computer in need of support. The requirement of credentials would depend on the transfer and/or execution method used in the Push process. Furthermore, this process, unlike conventional approaches, requires no existing piece of the support product to have been previously installed on the remote computer.

In one embodiment, the actual Push of software to the remote computer and its execution can be accomplished via SMB (System Management Bus), Windows RPC (Remote Procedure Calls)/IPC (Inter Process Communication), Unix/Posix RPC, FTP (File Transfer Protocol), SSH (Secure Shell), HTTP (Hypertext Transfer Protocol) or other means.

The system, according to various embodiments, utilizes the following components (not shown): (1) a representative client application; (2) a Push Server—which is what handles the operations in within the appliance; (3) an optional Push Agent; and (4) a customer client application. It is contemplated that the Push Agent (e.g., Push Agent 901) can be an application that is installed on a system or alternatively can be a stand alone piece of hardware. The Push Server can be an application installed on an appliance 101 or a system (e.g., representative system 903, remote system 905, or remote system 907 of the data network 909) or alternatively can also be a stand alone piece of hardware. The Push Server can also be a piece of software integrated into the representative client application (e.g., executing on the representative system 901) where it serves its purpose within the application in the background.

Furthermore, this Push Agent 901 can be used as an agent for other purposes, such as a connection agent to another server (not shown) in its network (e.g., the network 911) or a second network (e.g., networks 909 or 913); that is, providing a connection to and forwarding of operations via a Push Agent 901, from the first network 907 to a device of a second network (e.g., devices 917-921 of the network 911 or devices 923-927 of the network 913) via, for instance, a third network 915.

In this example, a customer client application resident within a remote access and control appliance 101 or a Push server (not shown) can be accessed by a service representative system 903 which is running a representative client application. The customer client application can be transferred to a remote system in this network (Local Push) (e.g., remote systems 905 and 907 of the network 909) by utilizing a 'Push Agent' system or the service representative system 903's representative client application. In this manner, an IT service representative, for instance, can perform problem resolution, maintenance, and infrastructure development tasks quickly and easily from a single point.

The network visibility of the support representative's computer 903 is limited to the networks to which it is connected. Therefore, with no extra means provided, the reach of the Push feature from the support representative's computer is limited to only those computers to which network traffic is routable. To extend this range, a Push Agent 901 is introduced; for example, one such an agent is known as Jumpoint™ by Bomgar™. The Push Agent 901, in an exemplary embodiment, is an application installed on a computer that can perform the push-and-execute operation on behalf of authorized support representatives. Alternatively, the Push Agent 901 can be a standalone piece of hardware. The support representatives may be in contact with the Push Agent 901 by their mutual participation on an overlay network 915, by HTTP (Hypertext Transfer Protocol), VPN (Virtual Private Network), by programmatic email, or by any other means devised for the support representative's computer to communicate with the Push Agent 901. The 'Push Agent' supports a fully integrated software distribution mechanism for ease of installation of the remote access and control Push Agent on a managed system (e.g., remote access and control appliance 101 or computer) over the network 915.

It is contemplated that the Push Agent 901 can be an application that is installed on a system or alternatively can be a stand alone piece of hardware. The Push Server can be an application installed on an appliance or a system or alternatively can also be a stand alone piece of hardware. The Push Server can also be a piece of software integrated into the representative client application where it serves its purpose in within the application in the background.

Furthermore, this Push Agent 901 can be used as an agent for other purposes, such as a connection agent to another server (not shown) in the second network; that is, providing a connection to and forwarding of operations via a Push Agent 901, from a first network to a device of a second network.

After the support representative system is connected to the remote Push Agent 901 (which resides within an appliance 101 or a computer) via the Push Server, the service representative system 903 prompts the remote Push Agent 901 to transfer an application to a remote computer (e.g., remote systems 923-927), which resides outside of the network. In an exemplary embodiment, a Web browser based remote control is available and can perform a push instruction from a remote site to a targeted Push Agent 901. Upon receiving a request, the remote Push Agent 901 transfers the application to a client remote system. In this manner, integrated remote access and control tools enable both efficient remote problem resolution and critical visibility limitation when deploying application to a targeted client remote system. This also enables a service representative to efficiently implement application tools and maintain security throughout the enterprise right from the representative's desk.

In an exemplary embodiment, the appliance 101 uses certificate-based authentication to establish a persistent connection to the Push Agent 901. When requesting a remote control session on a remote system via the Push functionality, the appliance 101 ensures that the representative 903 has the right to push the customer client application to a targeted remote client system (e.g., remote system 917). The customer client application then can be transferred from the Push Agent 901 to the remote client system. The remote client system can then establish a session connection to the service representative's system. In some cases, the session connection traverses one or more firewalls 927-931 as previously described.

Figure 10:
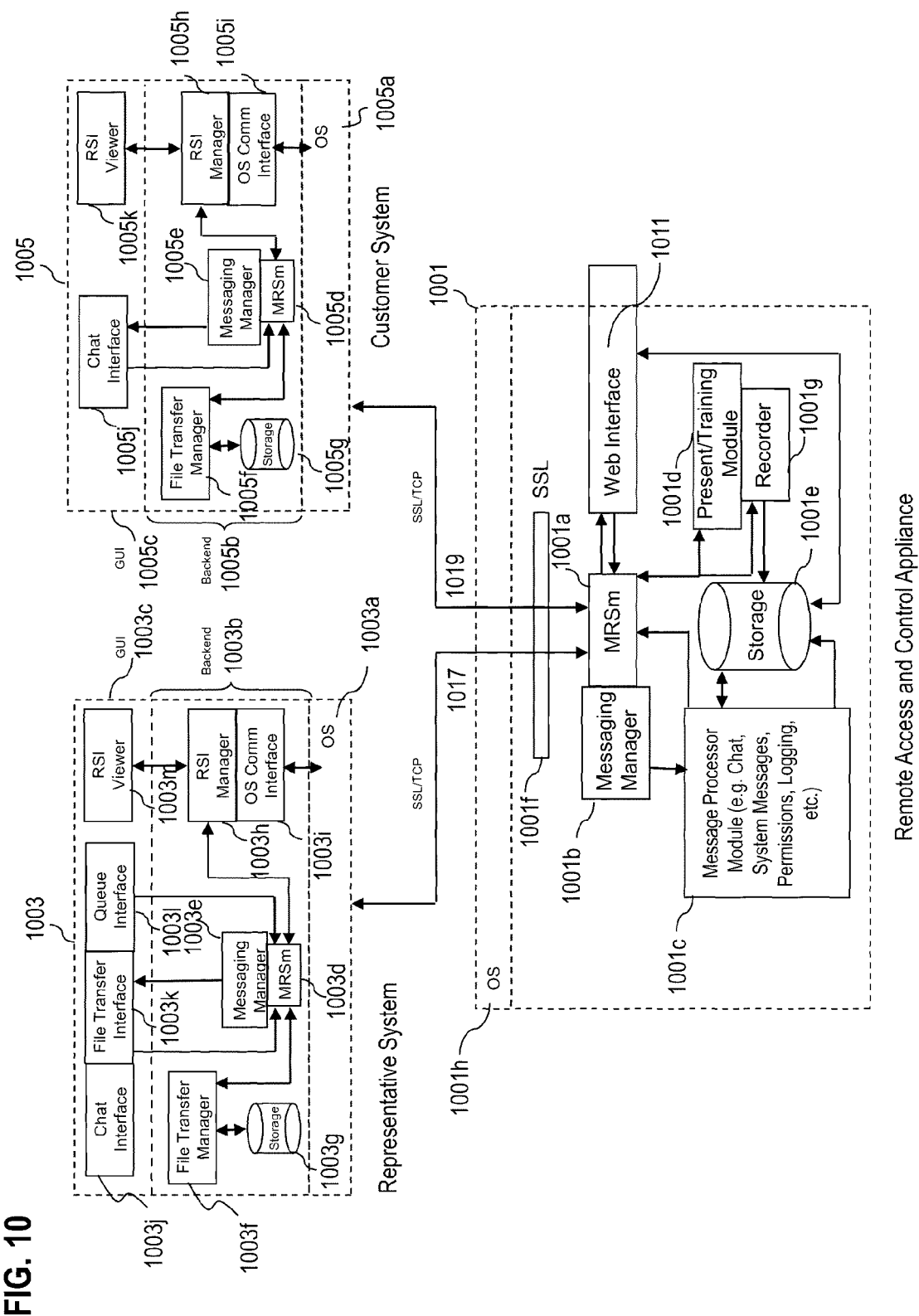
FIG. 10 is a diagram of the software architecture of the communication system of FIG. 1, according to an exemplary embodiment.

FIG. 10 is a diagram of the software architecture of the communication system of FIG. 1, according to an exemplary embodiment. The product data transfer architecture, in one embodiment, is formed based on a message handling and routing system—denoted as a Message Router System (MRS) which includes a collection of MRS modules (i.e., MRSm 1001a). The MRSm's 1001a, 1003d, and 1005d provide a message routing system that enables the routing of data within envelopes among the appliance 1001, representative system 1003 and remote customer system 1005 with, for example, mailboxes as data endpoints. The mailboxes, which can be used for sending and receiving data, are also responsible for all handling of encoding (creation) and decoding of message envelopes with appropriately designed read and write methods. By way of example, the message envelope can include the following fields: a fromRouterID field specifying an identifier associated with the MRS 1001a, a toRouterAddress field specifying addressing information of the destination routing module.

In addition, the MRS 1001a can communicate with other modules in a manner similar to that described above. By way of example, the MRSm 1001a can communicate with the web interface 1011, a message manager 1001b, a message processor module 1001c (includes chat, permission, logging, etc), a present/training 1001d, a secure layer module 1001f (e.g., SSL wrapper module), and a recorder module 1001g. The web interface 1011 can communicate with other application modules via the MRS 1001a.

In an exemplary embodiment, the web interface 1011 includes the following: (1) a network configuration web interface; (2) a User/Admin web interface which includes but not limited to user profile configuration, log reporting interface, and administrative user interface; (3) a support portal that provides, in an exemplary embodiment, front end survey and session key submission components; and (4) a customer satisfaction (exit) survey. According to one embodiment, the web interface provides functions for configuring the appliance 1001 to be deployed and integrated into the network infrastructure of the installer. In one embodiment, all other interfaces can communicate through the MRSm 1001a or to a storage module 1001e directly.

For ensuring proper dispatching of system messages received at the MRSm 1001a, a message manager 1001b can be used in this exemplary embodiment. These messages can include such data as chat data, session system data logging, system message posting, and system message queries, etc.

The message processor module 1001c receives system messages from MRSm 1001a via the message manager module 1001b. These messages can include such date as chat, session system data logging, system message posting, system message queries, permissions queries, and storage data retrievals.

The present-training module 1001d is configured to reduce the amount of screen update data transmitted from the client-side. In an exemplary embodiment, the present-training module 1001d includes the following components (not shown): a viewer component, and one or more remote screen image servers. These servers collect RSI change updates and send them on to the RSI viewer via the MRSm 1001a. The viewer component receives RSI update data from a client-side (remote-side in this case) server via the MRSm 1001a and then sends the data off to the active servers to be transmitted to the appropriate destination. The main stream of RSI update data can be transmitted to the appropriate client via the MRSm 1001a. Another stream of screen update data is transmitted to the recorder module 1001g to be written into the storage module 1001e.

The SSL module 1001f ensures that the data transfer between the appliance 1001 and the representative and customer system (1003 and 1005) is encrypted, e.g., 256-bit AES SSL encryption over links 1017 and 1019.

In one embodiment, the remote access and control appliance 1001 utilizes an operating system (OS) 1001h that supports a variety of applications. For example, a web server application can run on top of the OS 1001h to provide web hosting capabilities. The OS 1001h can also support SSL. The SSL wrapper module 1001f provides SSL over Transmission Control Protocol (TCP) or other network protocols.

As described, in one embodiment, the network appliance utilizes an OS 1001h with a web server for providing web hosting capabilities. The routing and handling module (e.g., MRSm) 1001a, which is a transport layer atop the OS 1001h, provides various network facilities. Accordingly, MRSm 1001a provides the generic means of transporting data from one system to another.

The MRSm 1001a of the network appliance 1001 can communicate with the customer application of customer system 1005, and the representative application of the representative system 1003 or another appliance.

Under this example, the representative system 1003 and customer system 1005 include operating systems 1003a, 1005a; backend components 1003b, 1005b; and GUIs 1003c, 1005c. The backend components 1003b of the representative system 1003 can include a MRSm 1003d, a message manager module 1003e, and a file transfer manager module 1003f. The module 1003f interfaces with a storage module 1003g, which is configured to store retrieved content stemming from the operation of the file transfer manager module 1003f. The backend components 1003b also include a RSI manager module 1003h. Yet another module 1003i (i.e., OS interface module), which is integral to the backend components 1003b, provides communication interfaces to the OS 1003a. As shown, the backend components 1005b of the customer system 1005 resemble that of the backend components 1003b of the representative system 1003: a MRSm 1005d, a message manager module 1005e, and a file transfer manager module 1005f, a storage module 1005g, a RSI manager module 1005h, an OS interface module 1005i.

As for the GUI 1003c, the representative system 1003 can provide a number of interfaces depending on the applications. For instance, the GUI 1003c can include a chat interface 1003j, a file transfer interface 1003k, a queue interface 10031, and a viewer 1003m. In this example, the customer system 1005 utilizes a chat interface 1005j and a viewer 1005k. The GUI 1003c can include other interfaces such as remote command shell, system diagnostics, and system information to name a few. The GUI 1005c can include application specific chooser interface to only allow specific application viewing.

As explained with respect to the operation of the network appliance 1001, the MRSm 1003d is the medium for handling all messages coming to the representative application 1021 and all messages sent from the representative application 1021. The MRSm 1003d communicates with the message manager 1003e, a RSI manager 1003h, and the file-transfer manager modules 1003f. The system messages, session data, and chat data are delivered to the message manager module 1003e. The MRSm 1003d sends, as well as receives, system/control messages and RSI update data to and from the RSI manager module 1003h. The MRSm 1003d interacts with the file-transfer manager 1003f in sending and receiving system messages and file-transfer data.

The file-transfer manager 1003f handles all remote-to-local and local-to-remote (i.e. between the representative system and the customer system) reading and writing of files. The system messages and file-transfer data are received and sent through the MRSm 1003d. Notably, the file-transfer interface module 1003k on the GUI component 1003c receives data from the MRSm 1003d and sends all data directly to the MRSm 1003d. Assuming the permissions to the customer file system access have been granted, the processes and steps involved in transferring a file from representative storage 1003g to the customer storage 1005g include an initiation of a file transfer from the file-transfer GUI, a system command message sent to the MRSm 1003d. MRSm 1003d delivers the command to the file-transfer manager module 1003f to execute on constructing the data to be sent to MRSm 1005d of the customer system 1005 via the MRSm 1003d. A system notification message is delivered to the message manager 1003e via MRSm 1003d to be displayed in the chat GUI 1003j after being delivered there by the message manager 1003e. The processes and steps involved in transferring a file from the customer to the representative include an initiation from the file-transfer GUI 1005k, a system command message sent to the file-transfer manager 1005f via the customer MRSm 1005d. The file-transfer manager 1005f constructs a proper remote file transfer request, which is then sent through the customer MRSm 1005d to the representative MRSm 1003d through the MRSm 1001a on the appliance. The representative MRSm 1003d receives the request command, delivering it to the remote file-transfer manager 1003f, which in turn, receives the file system data requested to be transmitted back to the customer MRSm 1005d by the representative MRSm 1003d through the MRSm 1001a on the appliance. The representative MRS 1003d delivers the file system data received from the customer MRS 1005d to the file-transfer manager 1003f for processing and storing in the local file system storage 1003g. Also, a system notification message as well as a file-transfer GUI refresh command is delivered to the file-transfer GUI 1003k via the dispatcher 1003e from the MRS 1003d.

The RSI manager modules 1003h and 1005h, in one embodiment, includes the following components: a RSI updater, which "paints" the RSI viewer GUIs 1003m and 1005k with RSI screen update data; RSI server, which utilizes the OS Communication Interface modules 1003i and 1005i. The OS communication interface modules 1003i and 1005i interfaces with the OS system 1003a and 1005a for detecting and listening for screen and system updates, collecting these updates, and packaging and encoding these updates into data to be then sent to the viewing system via the respective MRSm's.

The RSI manager modules 1003h and 1005h can also provide the capability of reverse viewing. In this mode, the viewing of the remote system is reversed to being viewed by the remote system.

The network appliance 1001 also permit support representatives to predict and lower the total cost of ownership (TCO) vis-à-vis the ASP model, in which the support representatives are typically charged a monthly fee. With the network appliance 1001, representatives can predict their budget without monthly fees, surcharges or overages.

Figure 11:
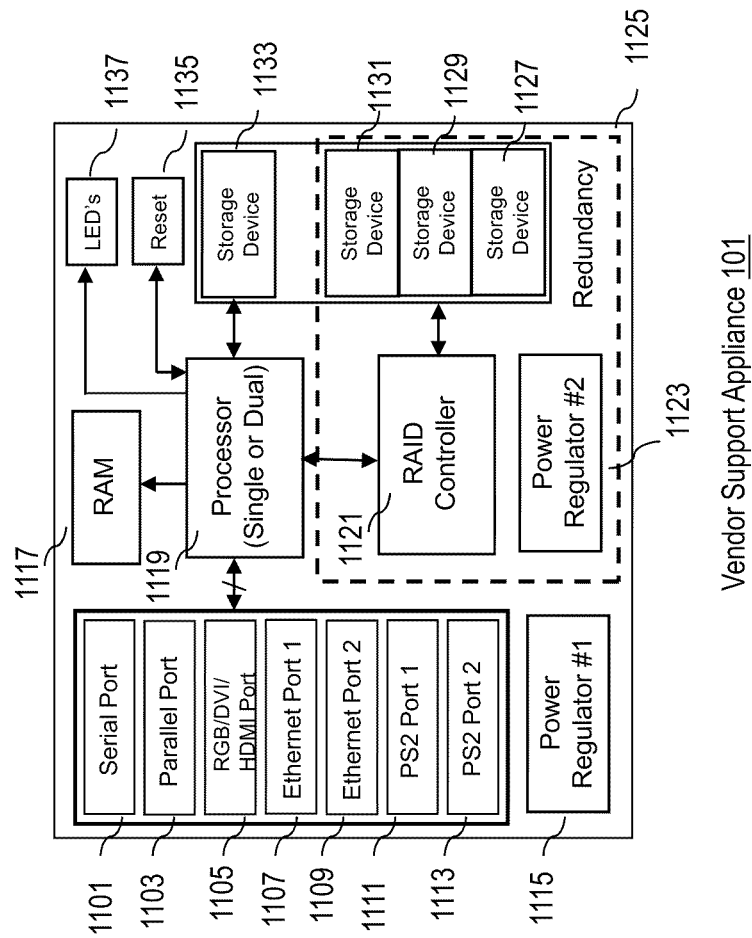
FIG. 11 is an exemplary hardware architecture of a remote access and control appliance, according to an exemplary embodiment.

FIG. 11 is an exemplary hardware architecture of a remote access and control appliance, according to an exemplary embodiment. The network appliance 101, in one embodiment, comprises various component interfaces, including serial and parallel ports 1101 and 1103, a display interface (e.g., an RGB (Red, Green and Blue) port 1105), local area network (LAN) ports (e.g., Ethernet ports) 1107 and 1109, and input device ports (e.g., PS2) 1111 and 1113. The network appliance 101 also contains a power regulator 1115, internal memory in the form of RAM (Random Access Memory) 1117, one or more processors 1119, each which may be a multi-core processor, LEDs (Light Emitting Diodes) 1137, reset control 1135 and a SATA (Serial Advanced Technology Attachment) storage drive 1133.

As mentioned, the network appliance 101, in an exemplary embodiment, can be a 1U rack-mountable server hardware. However, it is contemplated that configurations other than those illustrated in FIG. 11 can be constructed, depending on the particular applications. For example, different types of appliances can be designed for different uptime requirements. With uptime-critical customers, the network appliance 101 provides for fail-over redundancies; e.g., use of multiple disk drives 1127-1131, for Fail-over and Hot-Swap capabilities via a RAID (Redundant Array of Independent Disks) controller 1121. This configuration of the appliance 101 can also be equipped with a backup AC-DC (Alternating Current-Direct Current) regulator 1123, which can be triggered when the main regulator 1115 is detected as non-functional. Alternatively, for non-uptime-critical customers, the network appliance 101 can be configured without the additional hardware and/or software required for providing redundancies.

As earlier described, the network appliance 101, in an exemplary embodiment, can be a virtual appliance. Such software appliance can be run in a virtual environment. For instance, an image of the operating system and base software application can be installed on a virtual machine. Virtualization provides an abstraction layer that separates the operating system from the hardware, as to permit resource sharing. In this matter, different virtual machines (using heterogeneous operating systems) can co-exist on the same hardware platform.

The processes described herein for providing secure, on-demand remote support may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
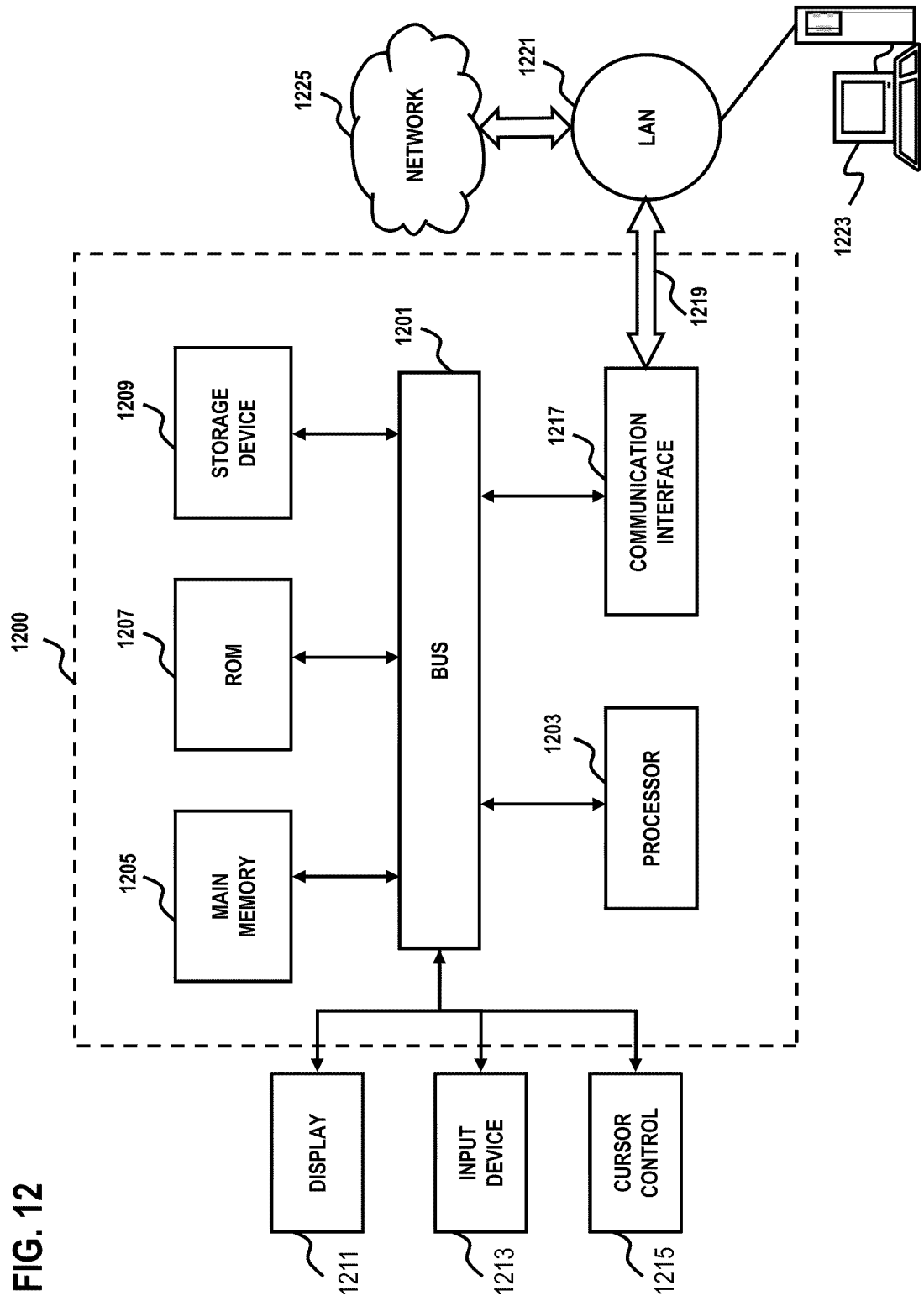
FIG. 12 is a diagram of a computer system that can be used to implement various embodiments of the invention.

FIG. 12 illustrates computing hardware (e.g., computer system) upon which an embodiment according to the invention can be implemented. The computer system 1200 includes a bus 1201 or other communication mechanism for communicating information and a processor 1203 coupled to the bus 1201 for processing information. The computer system 1200 also includes main memory 1205, such as random access memory (RAM) or other dynamic storage device, coupled to the bus 1201 for storing information and instructions to be executed by the processor 1203. Main memory 1205 also can be used for storing temporary variables or other intermediate information during execution of instructions by the processor 1203. The computer system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computer system 1200 may be coupled via the bus 1201 to a display 1211, such as a cathode ray tube (CRT), liquid crystal display, active matrix display, or plasma display, for displaying information to a computer user. An input device 1213, such as a keyboard including alphanumeric and other keys, is coupled to the bus 1201 for communicating information and command selections to the processor 1203. Another type of user input device is a cursor control 1215, such as a mouse, a trackball, or cursor direction keys, for communicating direction information and command selections to the processor 1203 and for controlling cursor movement on the display 1211.

According to an embodiment of the invention, the processes described herein are performed by the computer system 1200, in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. Thus, embodiments of the invention are not limited to any specific combination of hardware circuitry and software.

The computer system 1200 also includes a communication interface 1217 coupled to bus 1201. The communication interface 1217 provides a two-way data communication coupling to a network link 1219 connected to a local network 1221. For example, the communication interface 1217 may be a digital subscriber line (DSL) card or modem, an integrated services digital network (ISDN) card, a cable modem, a telephone modem, or any other communication interface to provide a data communication connection to a corresponding type of communication line. As another example, communication interface 1217 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1217 sends and receives electrical, electromagnetic, or optical signals that carry digital data streams representing various types of information. Further, the communication interface 1217 can include peripheral interface devices, such as a Universal Serial Bus (USB) interface, a PCMCIA (Personal Computer Memory Card International Association) interface, etc. Although a single communication interface 1217 is depicted in FIG. 12, multiple communication interfaces can also be employed.

The network link 1219 typically provides data communication through one or more networks to other data devices. For example, the network link 1219 may provide a connection through local network 1221 to a host computer 1223, which has connectivity to a network 1225 (e.g. a wide area network (WAN) or the global packet data communication network now commonly referred to as the "Internet") or to data equipment operated by a service provider. The local network 1221 and the network 1225 both use electrical, electromagnetic, or optical signals to convey information and instructions. The signals through the various networks and the signals on the network link 1219 and through the communication interface 1217, which communicate digital data with the computer system 1200, are exemplary forms of carrier waves bearing the information and instructions.

The computer system 1200 can send messages and receive data, including program code, through the network (s), the network link 1219, and the communication interface 1217. In the Internet example, a server (not shown) might transmit requested code belonging to an application program for implementing an embodiment of the invention through the network 1225, the local network 1221 and the communication interface 1217. The processor 1203 may execute the transmitted code while being received and/or store the code in the storage device 1209, or other non-volatile storage for later execution. In this manner, the computer system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 13:
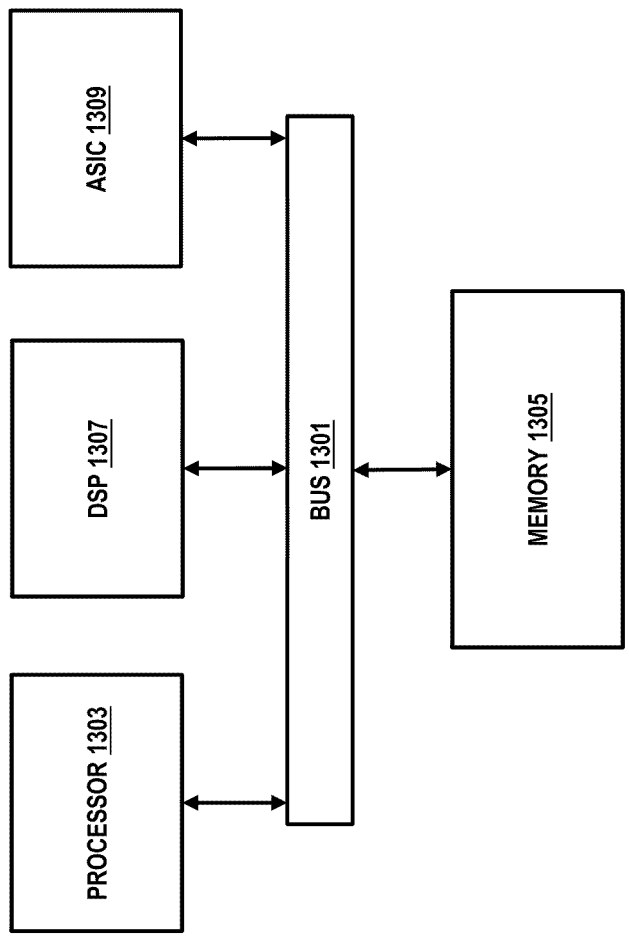
FIG. 13 is a diagram of a chip set that can be used to implement various exemplary embodiments.

FIG. 13 illustrates a chip set 1300 upon which an embodiment of the invention may be implemented. Chip set 1300 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of FIGS. 1B, 3B, 5B, 6B, 7B, and 8B.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 1305 also stores the data associated with or generated by the execution of the inventive steps.

While the invention has been described in connection with a number of embodiments and implementations, the invention is not so limited but covers various obvious modifications and equivalent arrangements, which fall within the purview of the appended claims.

What is claimed is:

1. A method comprising:
   detecting an attempt to establish a remote support session hosted on a remote support appliance that is configured to establish the remote support session between a first device associated with a support representative and a second device associated with a user,
   wherein the remote support appliance is under the physical and virtual computing control of the user;
   retrieving a credential that provides restricted access privileges in response to the detection;
   providing the credential to the first device for use in the establishment of the remote support session;
   establishing the remote support session; and
   during the remote support session, retrieving, from a third device associated with an access sponsor system, via the remote support appliance, an elevated credential that provides elevated access privileges to the first device in an ad-hoc manner,
   wherein the elevated credential is not provided to the support representative.

2. A method according to claim 1, further comprising:
   joining, by an access sponsor system associated with an access sponsor user, the remote support session to monitor activities conducted over the remote support session between the first device and the second device,
   wherein the third device comprises the access sponsor system.

3. A method according to claim 1, further comprising:
   receiving a request for the credential from the first device associated with the support representative;
   determining whether the support representative is authorized to use the credential; and
   selectively granting the request based on the determination.

4. A method according to claim 1, wherein the remote support appliance is a standalone hardware device configured to establish a secure connection for the remote support session.

5. A method according to claim 4, wherein the remote support appliance resides within a customer premise.

6. A method according to claim 1, wherein the remote support appliance is configured to provide a portal for a third party representative, and the portal is configured to push a remote support executable to the second device to initiate a pre-installed client to establish the remote support session.

7. A method according to claim 1, wherein the credential is maintained by an access sponsor module, and the remote support appliance includes the access sponsor module.

8. An apparatus comprising:
   at least one processor; and
   at least one memory including computer program code,
   the at least one memory and the computer program code configured to, with the at least one processor, cause the apparatus to perform at least the following,
   detect an attempt to establish a remote support session hosted on a remote support appliance that is configured to establish the remote support session between a first device associated with a support representative and a second device associated with a user,
   wherein the remote support appliance is under the physical and virtual computing control of the user,
   retrieve a credential that provides a restricted access privilege in response to the detection,
   provide the credential to the first device for use in the establishment of the remote support session,
   establish the remote support session, and
   retrieve, during the remote support session, from a third device associated with an access sponsor system, an elevated credential that provides elevated access privileges to the first device in an ad-hoc manner,
   wherein the elevated credential is not provided to the support representative.

9. An apparatus according to claim 8, wherein the apparatus is further caused, at least in part, to:
   join, by an access sponsor system associated with an access sponsor user, the remote support session to monitor activities conducted over the remote support session between the first device and the second device,
   wherein the third device comprises the access sponsor.

10. An apparatus according to claim 8, wherein the apparatus is further caused, at least in part, to:
    receive a request for the credential from the first device associated with the support representative;
    determine whether the support representative is authorized to use the credential; and
    selectively grant the request based on the determination.

11. An apparatus according to claim 8, wherein the remote support appliance is a standalone hardware device configured to establish a secure connection for the remote support session.

12. An apparatus according to claim 11, wherein the remote support appliance resides within a customer premise.

13. An apparatus according to claim 8, wherein the remote support appliance is configured to provide a portal for a third party representative, and the portal is configured to push a remote support executable to the second device to initiate a pre-installed client to establish the remote support session.

14. An apparatus according to claim 8, wherein the credential is maintained by an access sponsor module, and the remote support appliance includes the access sponsor module.

15. A system comprising:
a remote support appliance configured to establish a remote support session between a first device associated with a support representative and a second device associated with a user, wherein the remote support appliance is under the physical and virtual computing control of the user; and
an access sponsor configured to detect an attempt to establish the remote support session, to retrieve a credential that provides a restricted access privilege for the establishment of the remote support session, establish the remote support session, and, during the remote support session, to retrieve an elevated credential that provides an elevated access privilege in an ad-hoc manner wherein the elevated credential is not provided to the support representative.

16. A system according to claim 15, wherein the remote support appliance is a standalone hardware device configured to establish a secure connection for the remote support session, the remote support appliance residing within a customer premise.

17. A system according to claim 15, wherein the remote support appliance includes the access sponsor.

18. A method according to claim 1, wherein the elevated credential that provides elevated access privileges is retrieved in response to a request.

19. A method according to claim 1, wherein the elevated credential that provides elevated access privileges is retrieved in response to a pre-defined automated mechanism.

20. A method according to claim 1, wherein the elevated credential is provided only to the second device.

* * * * *